United States Patent [19]
Maxwell et al.

[11] Patent Number: 5,675,784
[45] Date of Patent: Oct. 7, 1997

[54] DATA STRUCTURE FOR A RELATIONAL DATABASE SYSTEM FOR COLLECTING COMPONENT AND SPECIFICATION LEVEL DATA RELATED TO PRODUCTS

[75] Inventors: John E. Maxwell, Claredon Hills; Donald J. McDowell, II; Stephen W. Schaefle, both of Wheaton, all of Ill.

[73] Assignee: International Business Machnes Corporation, Armonk, N.Y.

[21] Appl. No.: 454,708

[22] Filed: May 31, 1995

[51] Int. Cl.[6] .......................... G06F 17/60; G06F 17/30
[52] U.S. Cl. ...................... 395/611; 395/610; 395/326
[58] Field of Search ........................ 364/401; 395/161, 395/600, 611, 610, 326

[56] References Cited

U.S. PATENT DOCUMENTS

| | | | |
|---|---|---|---|
| 4,479,196 | 10/1984 | Ferre et al. | 364/900 |
| 4,531,186 | 7/1985 | Knapman | 364/300 |
| 4,875,162 | 10/1989 | Ferriter et al. | 364/401 |
| 4,945,475 | 7/1990 | Bruffey et al. | 364/200 |
| 5,109,337 | 4/1992 | Ferriter et al. | 364/401 |
| 5,142,674 | 8/1992 | Barker et al. | 395/600 |
| 5,210,686 | 5/1993 | Jernigan | 364/403 |
| 5,257,185 | 10/1993 | Farley et al. | 364/419.19 |
| 5,319,542 | 6/1994 | King, Jr. et al. | 364/401 |
| 5,359,724 | 10/1994 | Earle | 395/425 |
| 5,367,627 | 11/1994 | Johnson | 395/161 |
| 5,404,505 | 4/1995 | Levinson | 395/600 |
| 5,414,834 | 5/1995 | Alexander et al. | 395/600 |
| 5,499,359 | 3/1996 | Vijaykumar | 395/600 |
| 5,504,879 | 4/1996 | Eisenberg et al. | 395/600 |
| 5,515,269 | 5/1996 | Willis et al. | 364/401 |
| 5,528,490 | 6/1996 | Hill | 364/403 |

*Primary Examiner*—Thomas G. Black
*Assistant Examiner*—Jean M. Corrielus
*Attorney, Agent, or Firm*—Whitham, Curtis, Whitham & McGinn

[57] ABSTRACT

A relational database system allows users to search for specific products based on component criteria. The relational database system allows for unlimited number and type of components to be associated with products and employs a data architecture that enforces consistent product data including consistent description format among like products and consistent component descriptions whenever components are used in products. Product and component specification data is arranged in such a way as to allow users to search for specific products based on component criteria. The structure allows for an unlimited number and type of components to be associated with products and can accommodate future technologies that are not yet identified. The database system employs a series of tables having relationships that promote consistency, accuracy and ease of use by employing selection lists wherever data redundancy is possible. The database system automatically concatenates product descriptions using a component table. The relational database system allows mathematical additions of component values, such as cumulative system memory accumulated over a period of time, via the use of a unit of measure table and measurement group table.

12 Claims, 18 Drawing Sheets

| FIG.14A | FIG.14C |
|---|---|
| FIG.14B | FIG.14D |

FIG.14

DATA STRUCTURE FOR A RELATIONAL DATABASE SYSTEM FOR COLLECTING COMPONENT AND SPECIFICATION LEVEL DATA RELATED TO PRODUCTS

BACKGROUND OF THE INVENTION

Field of the Invention

The present invention generally relates to relational database systems and, more particularly, to a data structure for a relational database system for collecting component and specification level data related to products. The relational database system provides a product information guide useful in classifying products according to product type, component makeup and specifications and has broad application in a variety of fields of commerce.

Background Description

The specific problem addressed by this invention is the problem of inconsistent product data of products in channels of distribution and sale. The solution provided by this invention relates in particular to personal computer and local area network products; however, the problem is of broader general scope involving many commercial fields including, for example, automobiles, appliances, and furniture, among others.

Considering the specific field of computer products, the open architecture of the original International Business Machines Corp. (IBM) personal computer (PC) in 1981 created a new market for personal computers, add-on components and peripherals. The development of compatible basic input/output systems (BIOSs) accelerated the third party market for personal computers and the after market for components and peripherals. While the original IBM specifications for the hardware and software of these systems were intended to foster compatibility, there was almost immediately a problem of incompatibility of systems due to variations in the BIOSs used and even the disk operating systems (DOS) supplied with original equipment manufacturer (OEM) computer systems. The problems of incompatibility were compounded with the introduction of local area networks (LANs), based on different standards (e.g., Ethernet versus Token Ring), new input/output (I/O) systems, such as the small computer system interface (SCSI) and the integrated device electronics (IDE) interface, and buses, such as the local bus and variations including the peripheral component interconnect (PCI) and Personal Computer Memory Card International Association (PCMCIA) cards.

The proliferation of many standards, all purporting to be compatible, has in fact led to many unforeseen incompatibilities in computer systems and in particular networked computer systems. One approach to addressing these problems which has received considerable attention in the industry is the forthcoming "plug-and-play" standard; however, this approach requires both hardware and software support not included in the currently installed base of personal computers and networks. As a practical matter, it is necessary to insure compatibility by component level specifications, but there is not currently available a source of such component level specifications.

As mentioned, the general problem is not limited to computer systems. Indeed, the automobile industry, for one, has always had a strong after market for installed options, some of which are offered by new car dealers. And increasingly manufacturers are relying on third party contractors to supply of parts under so-called "just-in-time" inventory management. Moreover, modem automobiles are equipped with multiple microprocessors, each programmed to perform different functions, such as engine and ride control. The programs for these microprocessors are often modified during a model year, and the microprocessors may be purchased from multiple sources and be of differing designs. The result is that often automobiles of the same model year might be equipped with parts from different suppliers, and this creates a problem in servicing. Furthermore, there is growing after market for updated microprocessors designed to enhance engine performance.

SUMMARY OF THE INVENTION

It is therefore an object of the present invention to provide a relational database system that allows users to search for specific products based on component criteria.

It is another object of the invention to provide a data structure for a relational database system that allows for unlimited number and type of components to be associated with products.

It is a further object of the invention to provide a relational database system that employs a data architecture that enforces consistent product data including consistent description format among like products and consistent component descriptions whenever components are used in products.

According to the invention, there is provided a data structure for a database system that allows the input and management of large quantities of data in an efficient manner. The data is classified using a three tiered hierarchical structure.

Domain—This is the highest level. Typical domains are hardware, software and services.

Class—The next level of classification groups similar products such as computer systems, monitors or pointers (all hardware domain classes). Each domain has its own group of classes.

Subclass—Subclasses have a specific set of components. All products in that subclass typically have these components. Components have attributes, and attributes have specification values associated with them.

Using this data structure, the system manages product and component specification data to allow users to search for specific products based on component criteria. In a search, the user selects a domain (e.g., hardware), a class (e.g., computer systems) and a subclass (e.g., laptops) from an input screen. Then the user inputs product specification and component group. The product specification may be a search function, such as, "like compaq% or toshiba% ". The component group includes a specification type name (e.g., processor), value (e.g., 40) and units of measure (e.g., MHZ). The unit of measure (UOM) allows for complex comparisons such as KB vs. MB vs. GB. The search output is a Results List of products that match the search criteria. The list includes manufacturer part number, description of the product, announcement data (if any), and cost. Double clicking on a product in the list provides a product maintenance screen with an extended view list of the product components. The components in the extended view list, in turn, can be selected to view attributes and specification values associated with them. The components are ordered by relative importance; e.g., in a computer system, the processor is the most important component, followed by the RAM, storage devices, etc.

In addition to product and component specification, economic data related to products is also stored in the data structure. For example, pricing and leasing information is stored, along with any warranty information. Warranty information may be displayed by clicking on a warranty button at the top of the screen. Optionally, product promotion information may be stored.

The data structure allows for an unlimited number and type of components to be associated with products and can accommodate future technologies that are not yet identified. Components can be used across multiple products. The data structure ensures that a component's attributes and specification values are consistent through a process of linking. The data structure for the database system comprises a series of tables having relationships that promote consistency, accuracy and ease of use by employing selection lists wherever data redundancy is possible. More particularly, the database system automatically concatenates product descriptions using a component table. The relational database system allows mathematical additions of component values, such as cumulative system memory accumulated over a period of time, via the use of a unit of measure table and measurement group table.

The data structure according to the invention comprises a series of linked tables, each table having one or more primary keys and a junction table having a plurality of fields. The fields in the junction table store information and provide links to other tables in the data structure. The linked tables include a product domain table identifying product domains, each product domain being linked to a product table which identifies manufactured or published products by part number and description or a service by an offering number and a description. The descriptions of the products, publications or services are formatted according to concatenation rules. The product table is linked to a component table containing component information, a pricing table containing pricing and leasing information, and a warranty table containing warranty information. The component table includes predefined, standard component types with filled-in specification values such that when product components and product component specifications are added, a user may choose from a list of common components to copy, thus promoting efficiency and data integrity. The component table is linked to a component specification table which, in turn, is linked to a unit of measure table quantifying entries in the component specification table allowing components to be compared. Optionally, other tables including a manufacturer table, a product promotion table may be added to the data structure, thereby accommodating a large amount of data for products stored in the catalog.

BRIEF DESCRIPTION OF THE DRAWINGS

The foregoing and other objects, aspects and advantages will be better understood from the following detailed description of a preferred embodiment of the invention with reference to the drawings, in which:

FIG. 14 is a block diagram showing the manner in which FIGS. 14A to 14D, taken together, are an entity relationship diagram illustrating a specific implementation of the data structure according to the invention.

DETAILED DESCRIPTION OF A PREFERRED EMBODIMENT OF THE INVENTION

The invention will be described in terms of a specific implementation as applied to computer systems, this being the origin of the problem addressed by the invention. However, it wilt be understood by those skilled in the art that the invention is not limited to this specific application but has a broader scope of application in the channels of distribution and sale of other and different products.

The invention may be implemented on a variety of hardware platforms, including personal computers (PCS), workstations, minicomputers, and mainframe computers. The invention may be advantageously implemented on parallel processors of various types. Parallel processing is common in mainframe computers and increasingly more common in minicomputers and workstations. Therefore, by way of example and not limitation, there is first described a representative hardware environment on which the invention may be implemented.

Figure 1:
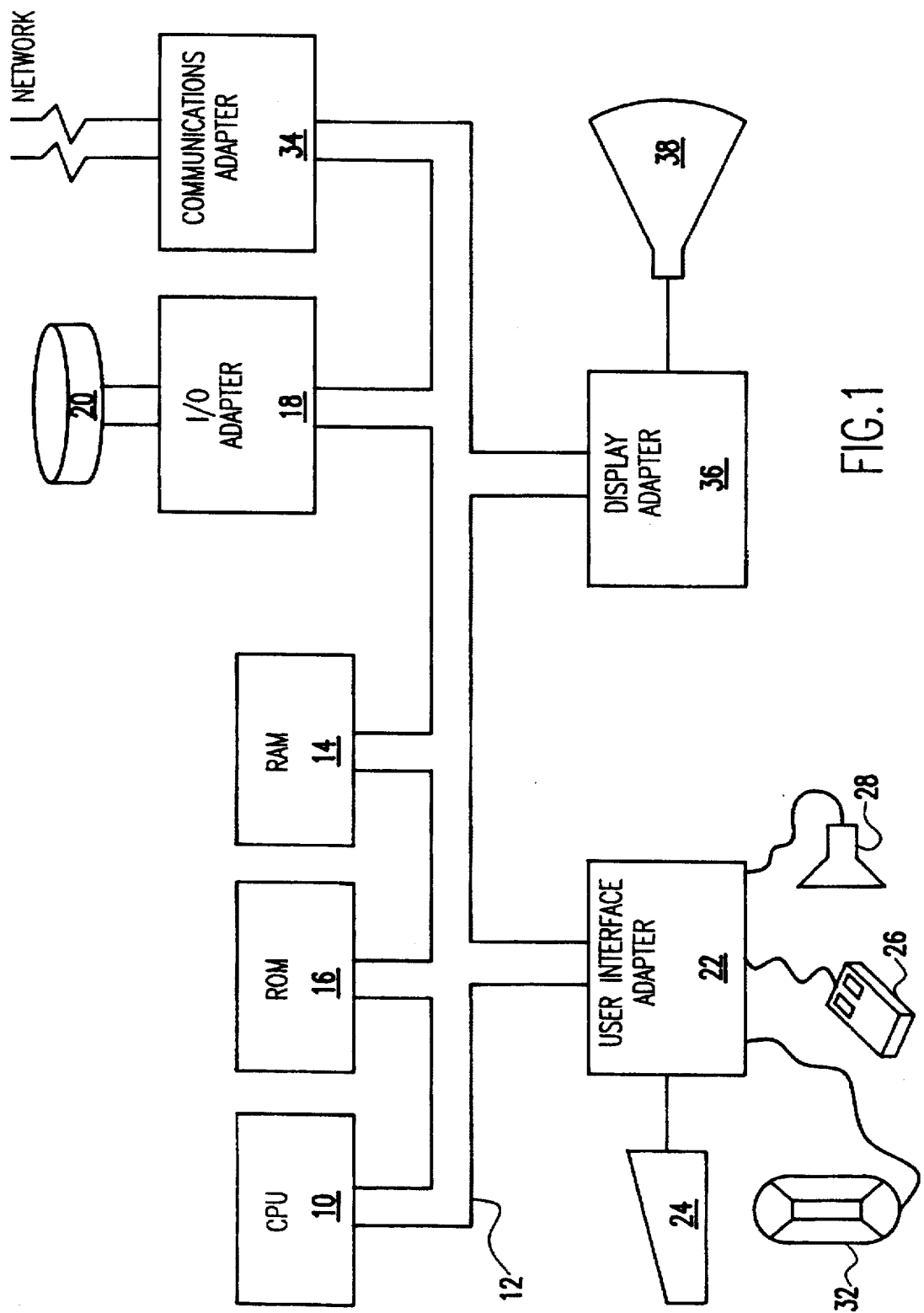
FIG. 1 is a block diagram showing a hardware configuration on which the subject invention may be implemented.

Referring now to the drawings, and more particularly to FIG. 1, there is shown a representative hardware environment which may be a personal computer, such as the International Business Machines (IBM) Corporation's PS/2 family of Personal Computers, or a workstation, such as IBM's RS/6000 Workstation. The hardware includes a central processing unit (CPU) 10, which may conform to Intel's X86 architecture or may be a reduced instruction set computer (RISC) microprocessor such as IBM's PowerPC® microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and date, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The user interface adapter 22 has attached a keyboard 24 to it, a mouse 26, a speaker 28, a microphone 32, and/or other user interface devices (not shown). The personal computer or workstation also includes a display 38, here represented as a cathode ray tube (CRT) display but which may be a liquid crystal display (LCD) or other suitable display. The display 38 is connected to the system bus 12 via a display adapter 36. Optionally, a communications adapter 34 is connected to the bus 12 and to a network, for example a local area network (LAN), such as IBM's Token Ring LAN. Alternatively, the communications adapter may be a modem connecting the personal computer or workstation to a telephone line as part of a wide area network (WAN).

The hardware platform shown in FIG. 1 represents but one example of hardware on which the subject invention may be implemented, but it also illustrates the problem which the inventive relational database addresses. Specifically, there may be multiple sources for the several adapters, such as the I/O adapter 18, communications adapter 34 and display adapter 36. Further, the "mother board", which typically includes the CPU 10, RAM 14, ROM 16, and user interface adapter 22, may be supplied by different sources, and on the mother board itself, CPUs from different manufacturers may be used and the amount and type of RAM may vary. The problem is to collect this component and specification level data for the product in such a manner as to provide a consistent description of the components and products which can be easily accessed.

Figure 2:
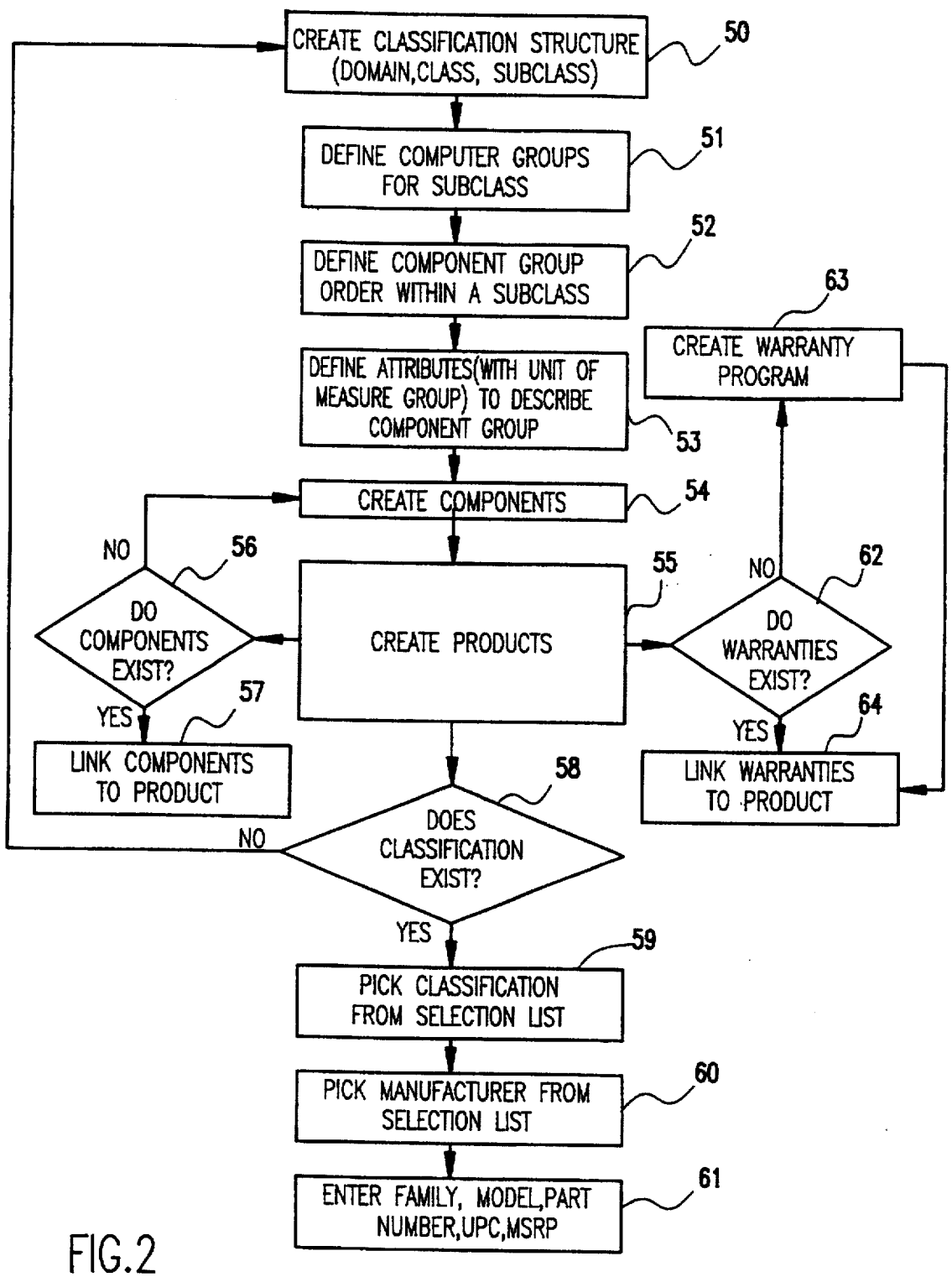
FIG. 2 is a high level flow diagram showing the overall logic for generating the relational database system according to the invention.
Figure 3:
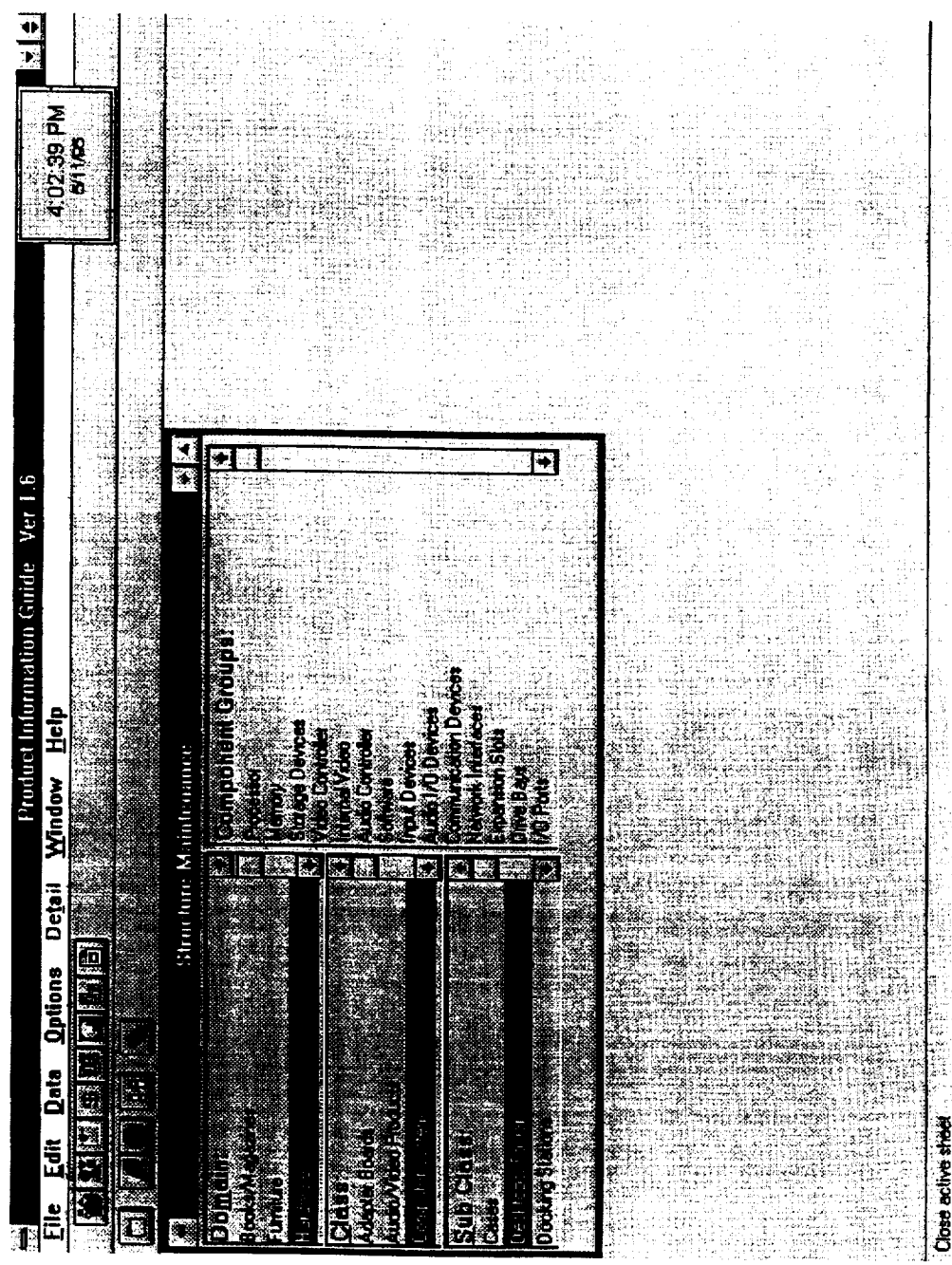
FIG. 3 is an illustration of a screen showing which illustrates the three tiered hierarchical data structure.

Turning now to FIG. 2 there is shown a high-level flow diagram of the process for generating the data structure for the relational database system according to the invention. Beginning with function block 50, a classification structure, i.e., domain, class and subclass, is created. As mentioned, the data structure is a three tiered hierarchical structure. The domain is the highest level of this structure. Typical domains for the example of computers are hardware, software and services. The next level of classification is the class which groups similar products such as computer systems, monitors or pointers, all hardware classes of the domain "hardware". Each domain has its own group of classes. The third level of the hierarchy is the subclass. Subclasses have a specific set of components. All products in that subclass typically have these components. FIG. 3 is a screen which illustrates the structure. In this example, the domain "hardware" is selected, the class "computer systems" is selected, and the subclass "desktops/towers" is selected.

Figure 4:
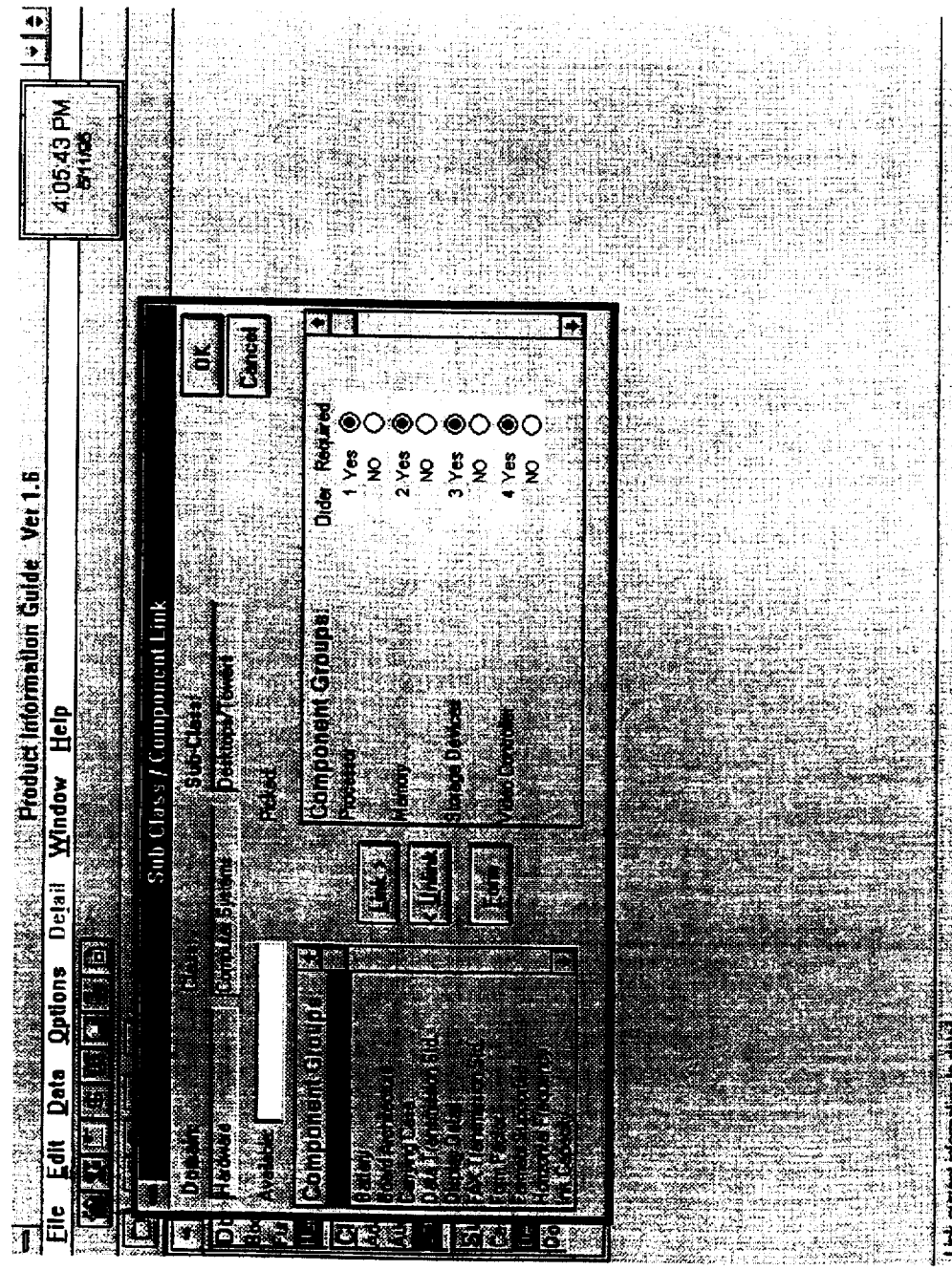
FIG. 4 is an illustration of a screen showing how component groups are ordered and linked to a subclass.

Components have attributes, and attributes have specification values associated with them. The component groups for the subclasses-are defined in function block 51, and the component group order within a subclass is defined in function block 52. Components are ordered by relative importance; for example, the processor is the most important component of a computer system, followed by the RAM, storage devices, and so forth, as shown in FIG. 3. Component groups are ordered and linked to a subclass using the screen shown in FIG. 4.

Figure 5:
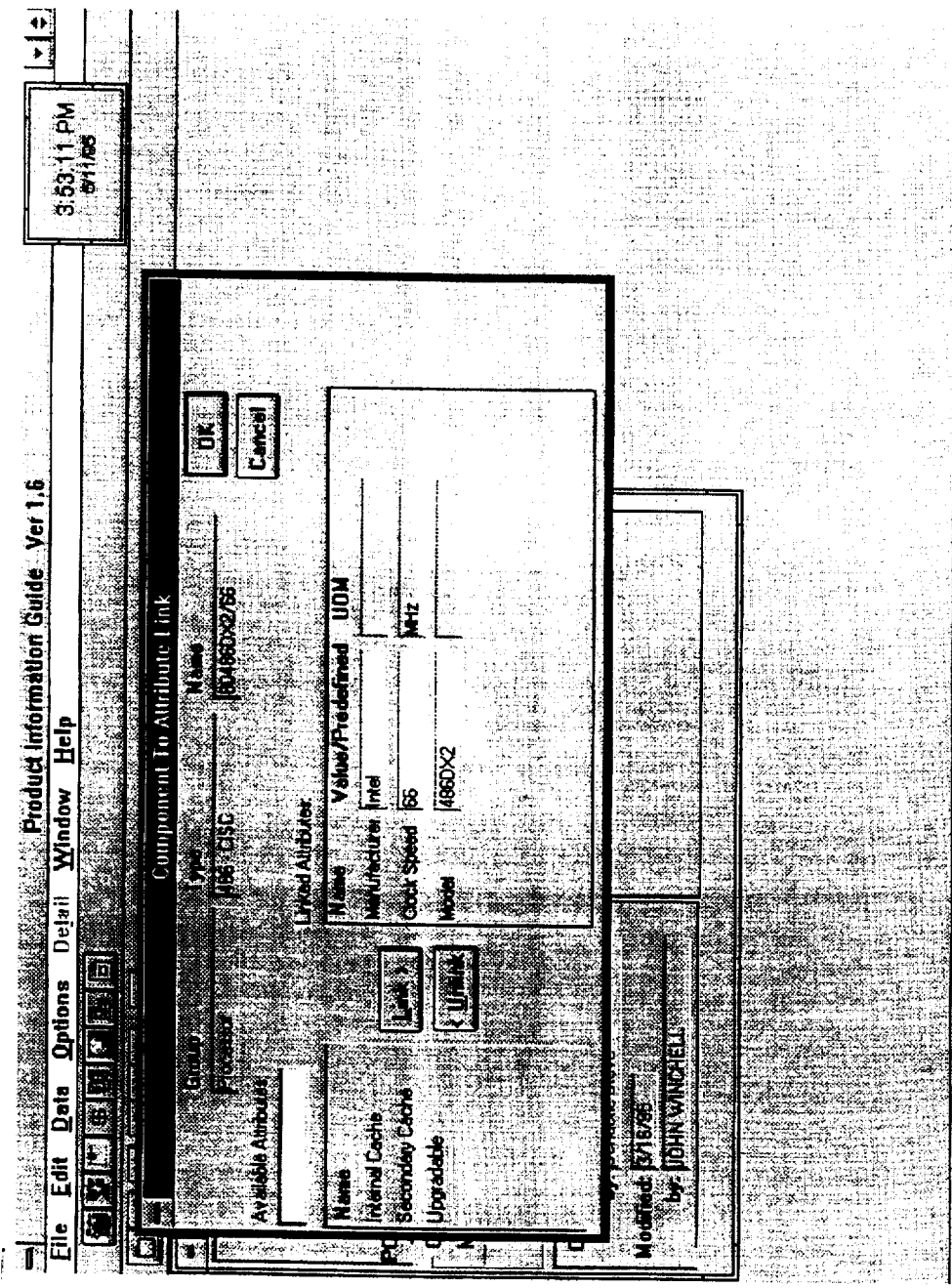
FIG. 5 is an illustration of a screen showing how a component is provided with attribute links.

Components are put together to define the technical makeup and establish product "identifiers" of a product. This defines a group for similar kinds of components. For example, a "storage device" is a component group that includes more specific kinds of storage devices, such as floppy drives and hard drives. Then, attributes are defined in function block 53 to describe a component group. These attributes include a unit of measure group, for example, the amount of RAM in a computer product, the clock speed of a processor, etc. The unit of measure (UOM) is a precisely specified quantity in terms of which the magnitudes of other quantities of the same kind can be stated and compared. Using the UOM, it is possible to establish a standard value for the specification value being measured. For example, disk drive capacities can be stated as 1.44 MB, 3.2 GB, and 720 KB and still be accurately compared using this concept. As a specific example, FIG. 5 shows a screen to provide component to attribute links, in this case a processor. The linked attributes for the processor are model "486DX2" manufactured by "Intel" having a clock speed of "66", where the unit of measure (UOM) is MHZ.

Figure 6:
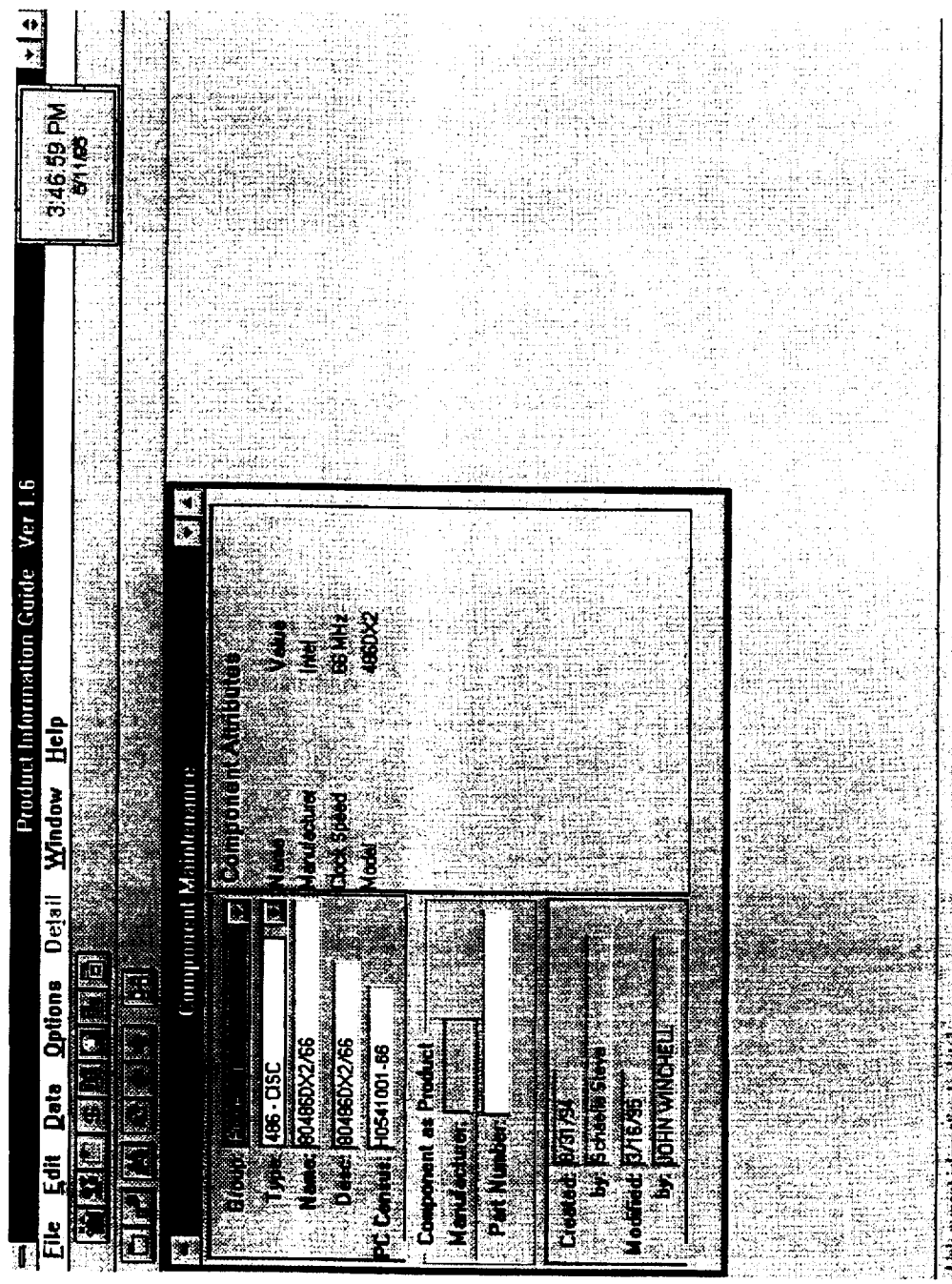
FIG. 6 is an illustration of a screen showing used for creating a component.
Figure 7:
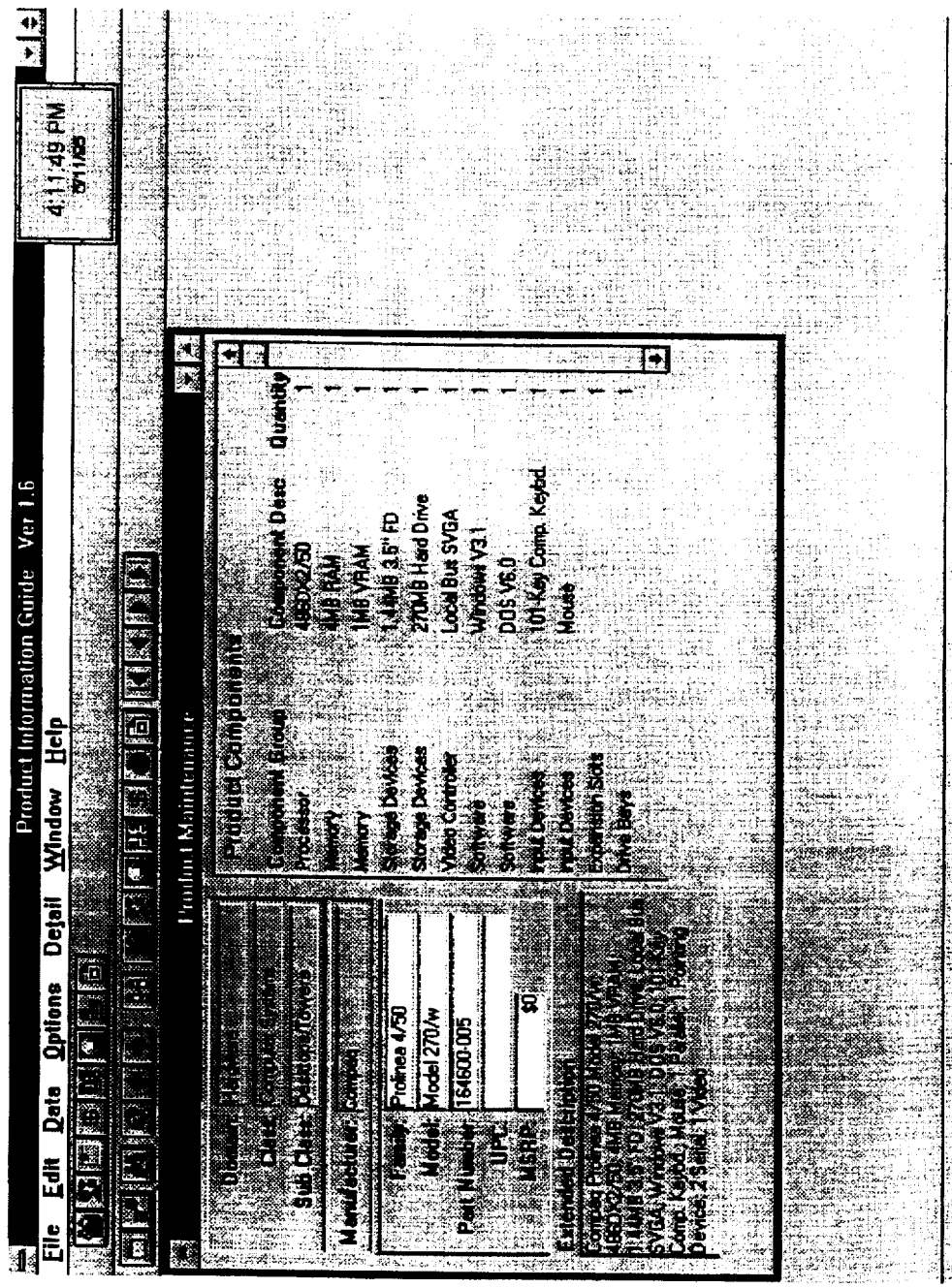
FIG. 7 is an illustration of a screen showing for creating a product.

Components are created in function block 54, and products are created in function block 55. FIG. 6 shows a screen used for creating a component, in this case a processor. Listed with the component are the linked component attributes. FIG. 7 shows a screen for creating a product, in this case a desktop computer manufactured by Compaq®. Listed with the product are the components that make up that product.

Figure 8:
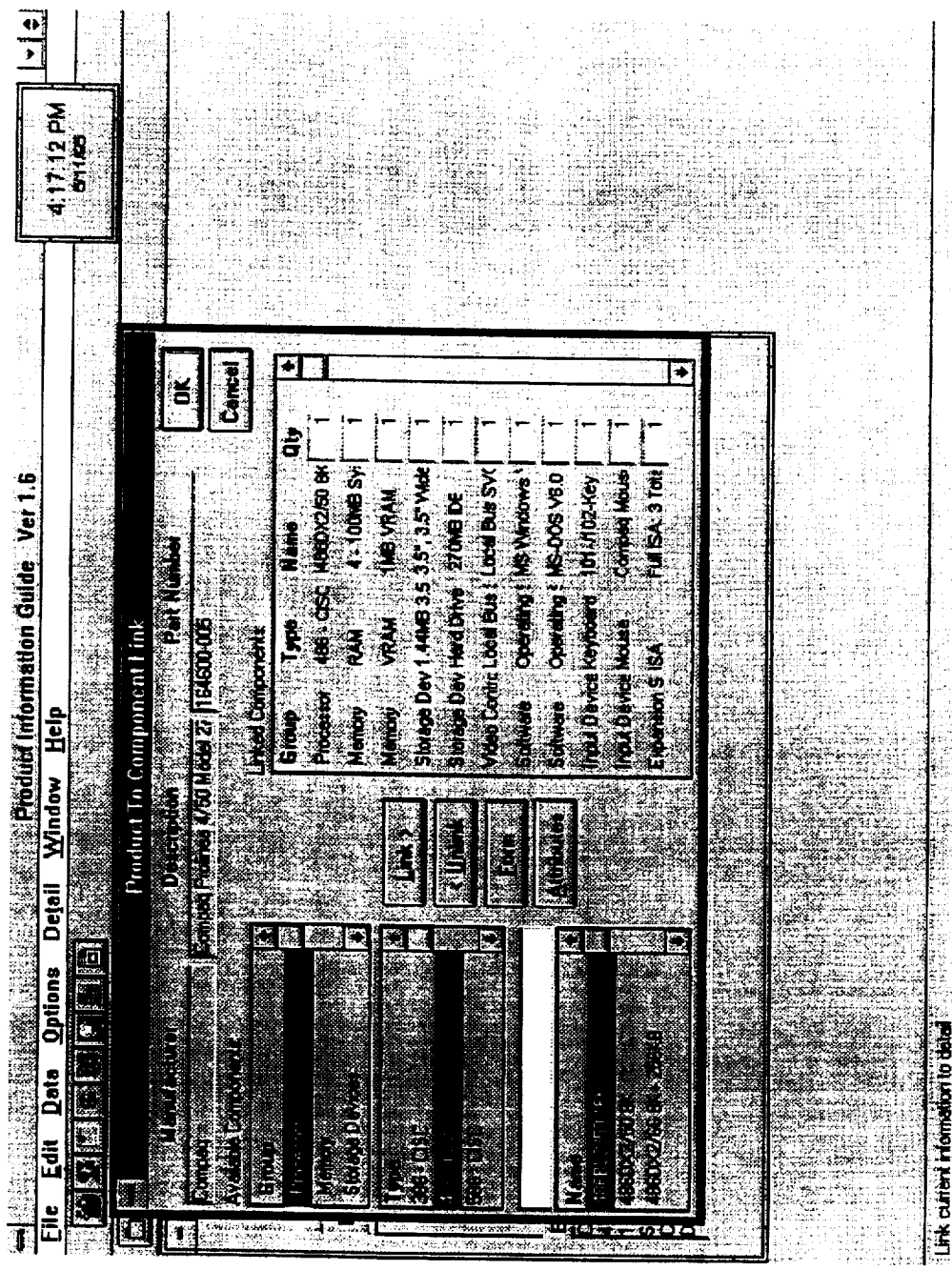
FIG. 8 is an illustration of a screen showing for linking components to a product.

The process branches in three directions at this point. First, a test is made in decision block 56 to determine if components exist for the product created. If not, the process loops back to function block 54 to create the components. When components exist for the product, these components are linked to the product in function block 57. FIG. 8 shows a screen for linking components to a product. The product is identified at the top of the screen by name of manufacturer, description and part number. The components to be linked to this product are shown on the left side, and the linked components are shown on the fight side.

Second, a test is made in decision block 58 to determine if a classification exists for the product created. If not, the process loops back to function block 50 to begin the creation of the classification structure. If a classification already exists, a classification is chosen from a selection list in function block 59. See FIG. 3. This is followed by choosing a manufacturer from a selection list in function block 60. Then, the family, model, part number, universal product code (UPC), and manufacturer's suggested retail price (MSRP) are entered in function block 61.

Figure 9:
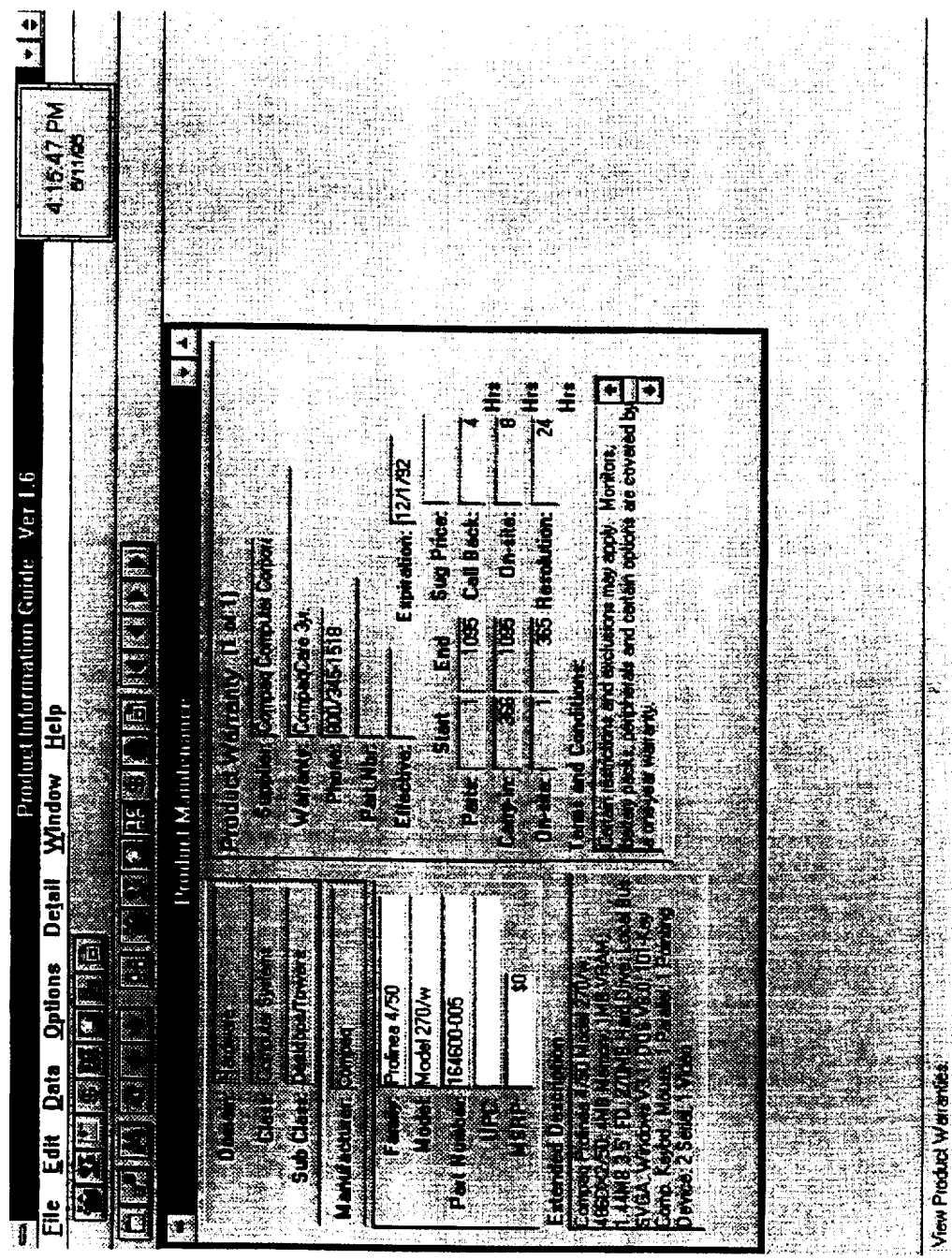
FIG. 9 is an illustration of a screen showing an example of a screen for creating a warranty program.
Figure 10:
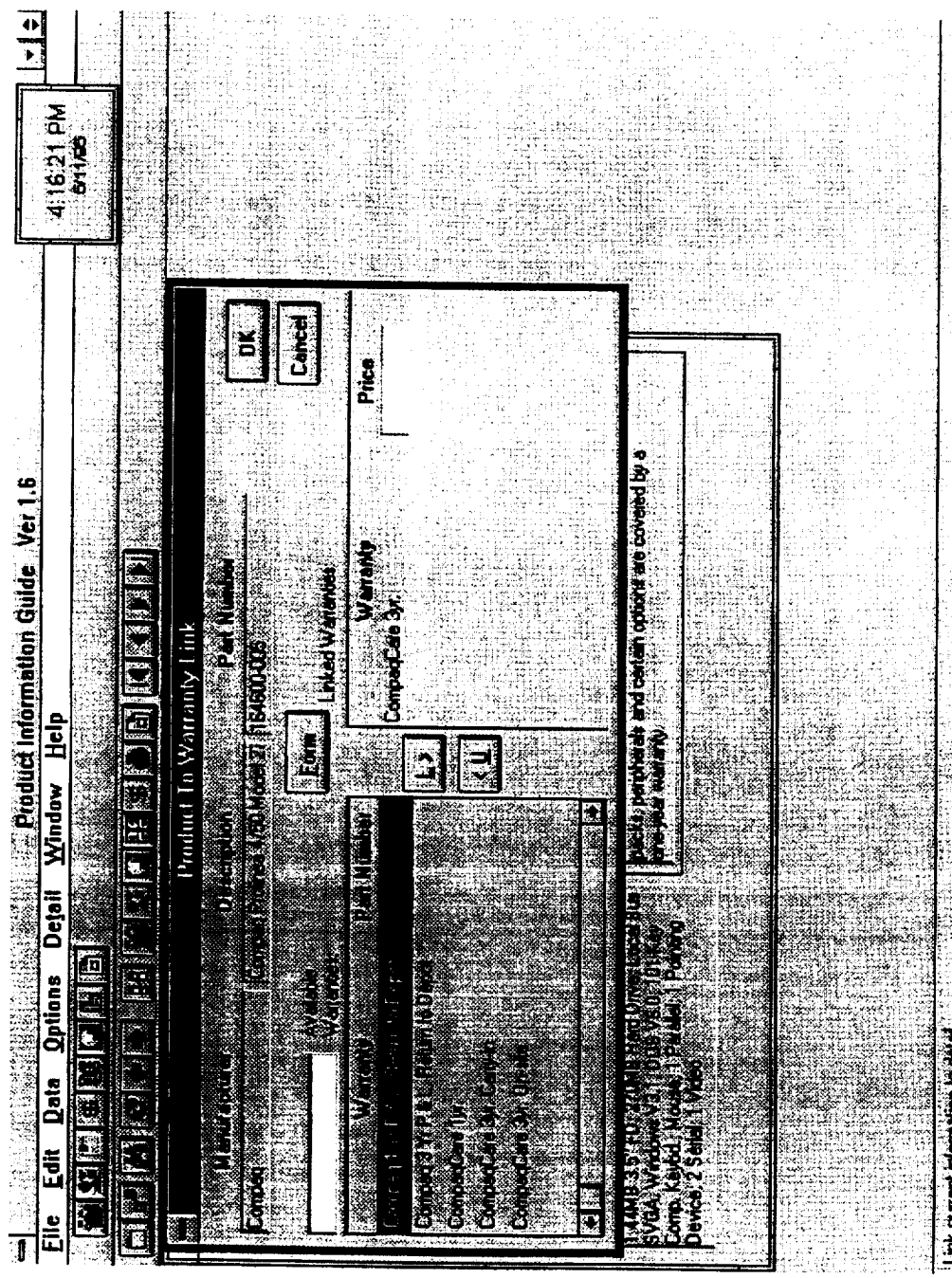
FIG. 10 is an illustration of a screen showing a screen for linking a warranty to a product.

Third, a test is made in decision block 62 to determine if there are any warranties for the product. If not, a warranty program is created in function block 63. FIG. 9 shows an example of a screen for creating a warranty program. When the warranty program is created or if warranties already exist, the warranties are linked to the product in function block 64. FIG. 10 is an example of a screen for linking a warranty to a product.

The data architecture of the invention enforces consistent product data including consistent description format among like products and consistent component descriptions wherever components are used in products. This data architecture enables a variety of search alternatives. Products can be searched by product identifiers including classification scheme, manufacturer, manufacturer model, manufacturer family and model, and so forth. Products can also be searched by specific component values. That is, a text value may be set "equal" or "not equal" to a "predefined specification value". Numeric values using the unit of measure conversion factor to compare specification values of a given measurement group having the same or different unit of manufacture (UOM).

Figure 11:
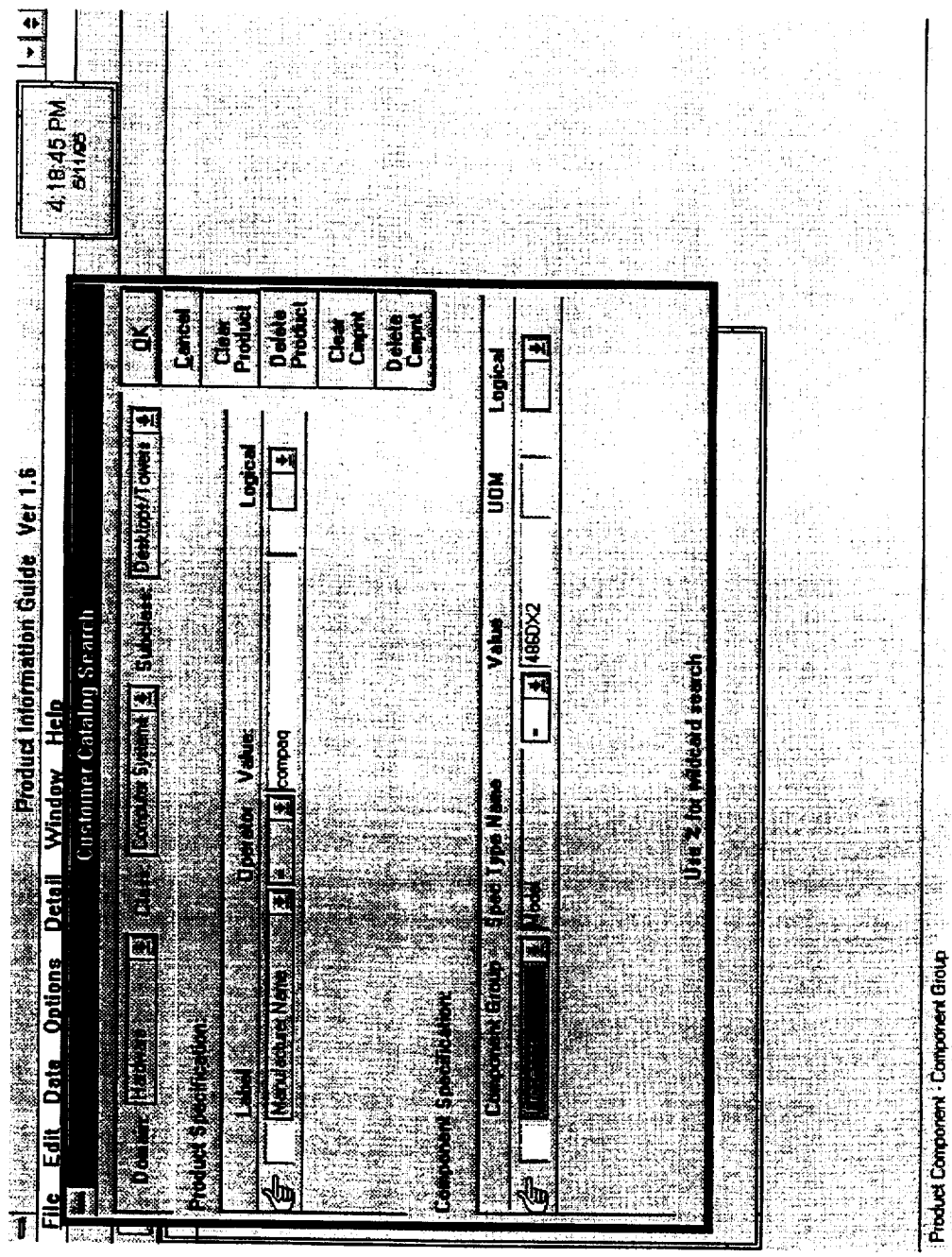
FIG. 11 is an illustration of a screen showing a screen in which a search strategy has been entered.
Figure 12:
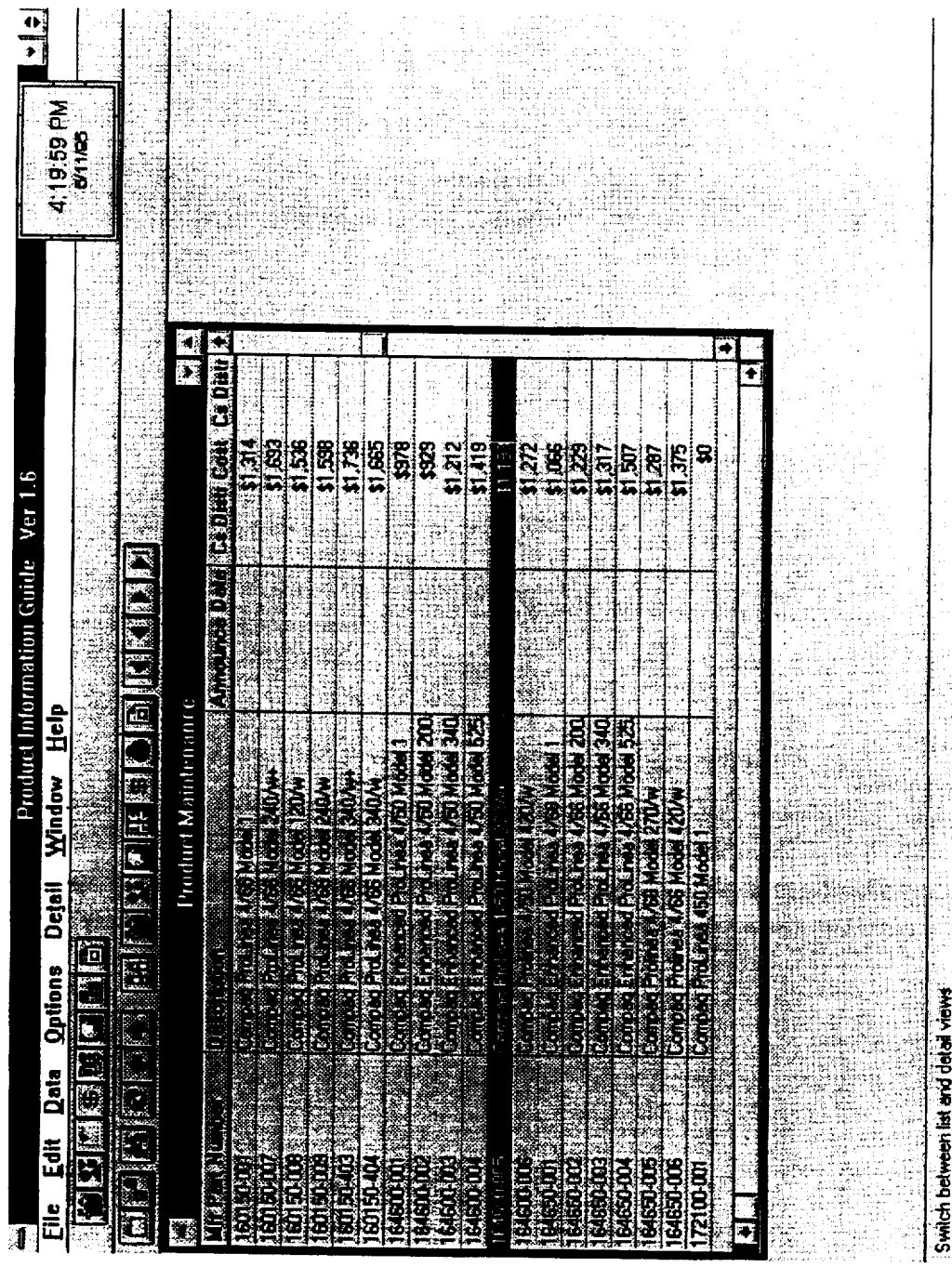
FIG. 12 is an illustration of a screen showing a Results List generated by the system for the search strategy shown in FIG. 12.

FIG. 11 shows a screen in which a search strategy has been entered. The domain selected is "hardware", the class selected is "computer systems", and the subclass selected is "desktops/towers". The product is specified by manufacturer, in this case Compaq®. More than one manufacturer may be specified as part of the search strategy. Next, the component specification is listed. In the case illustrated, the sole component is the processor, here a 468DX2. Again, more than one component can be used in the search strategy and alternatives may be used. For example, a component specification for a search might be a 486DX2 OR a Pentium® processor AND a CD ROM drive, where "OR" and "AND" are Boolean or logical operators. For the search strategy shown in FIG. 11, the system generates a Results List as shown in FIG. 12. This list shows by manufacture part number, description and price all the products in the database that meet the criteria in the search strategy.

Figure 13:
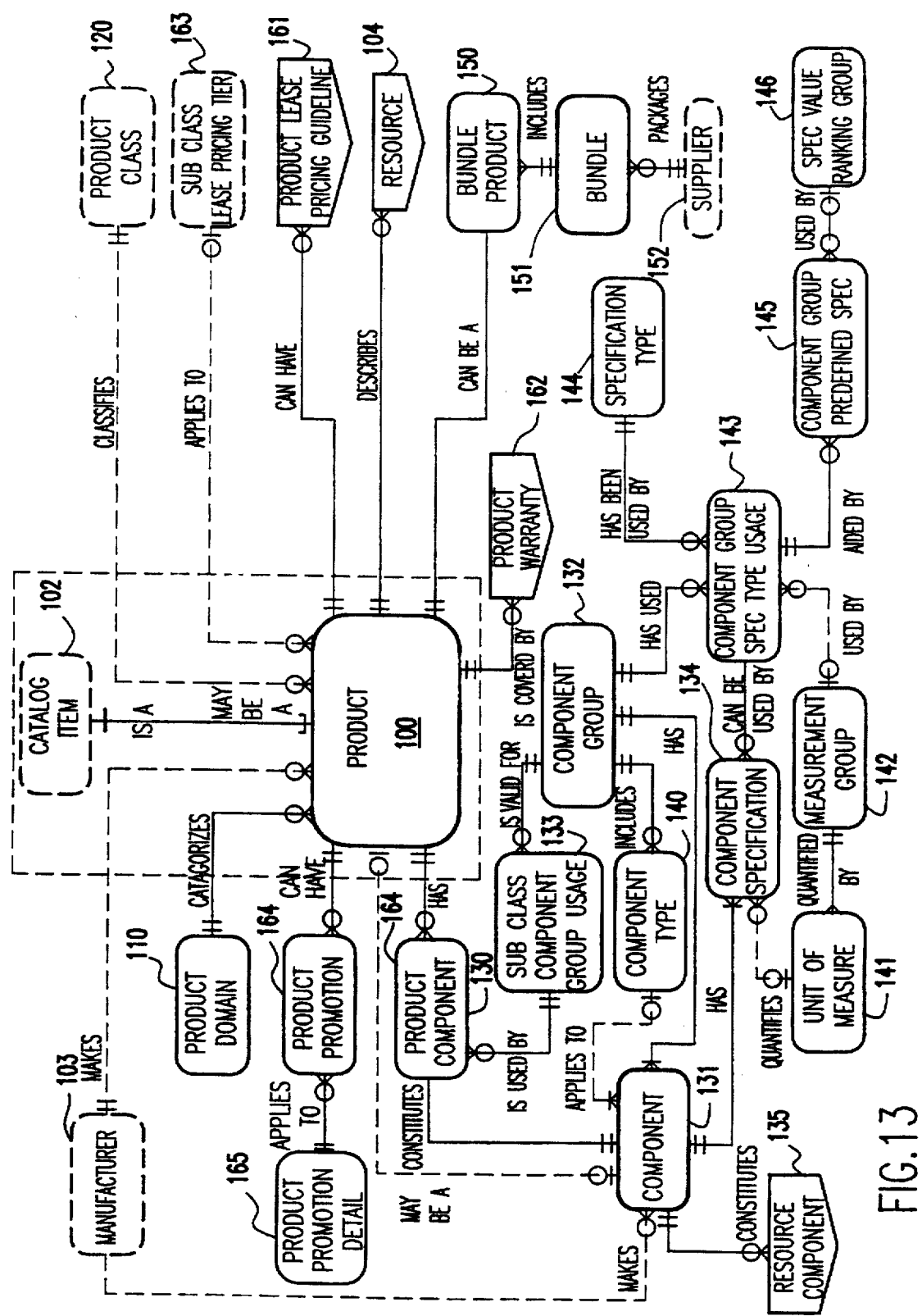
FIG. 13 is a block diagram of the data model according to the invention.
Figure 14A:
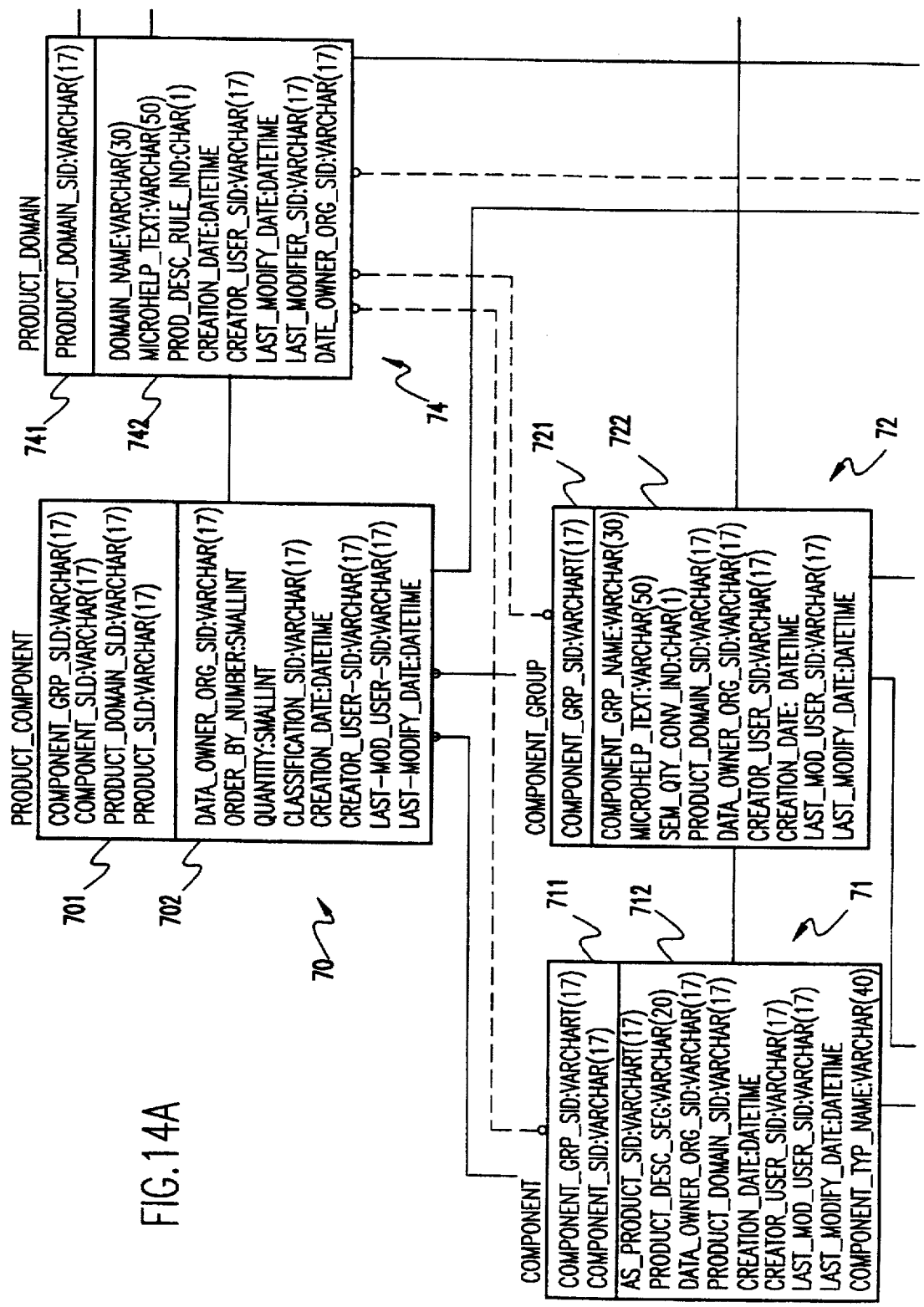
FIG. 14A to 14D are related.
Figure 14B:
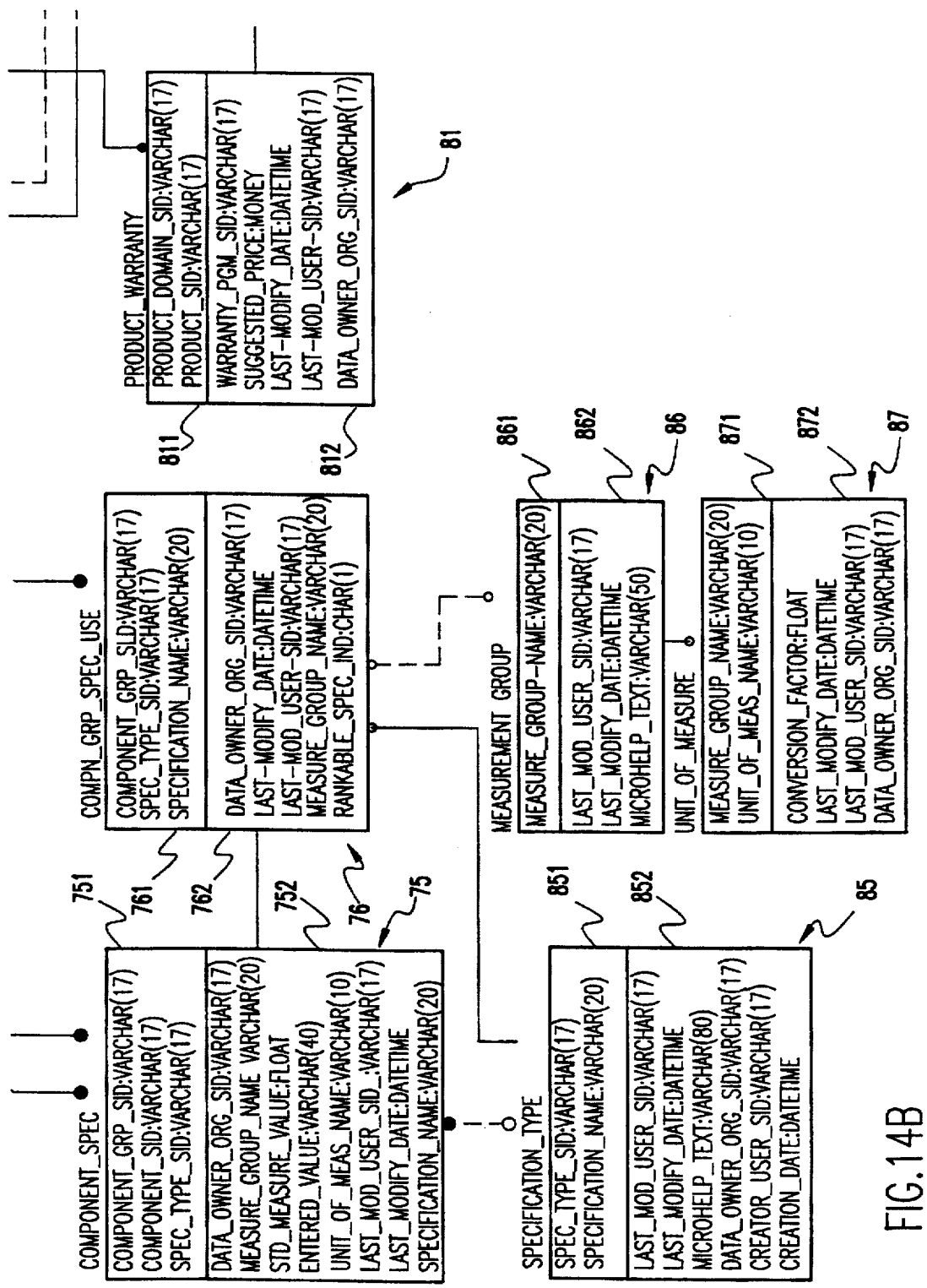
Figure 14C:
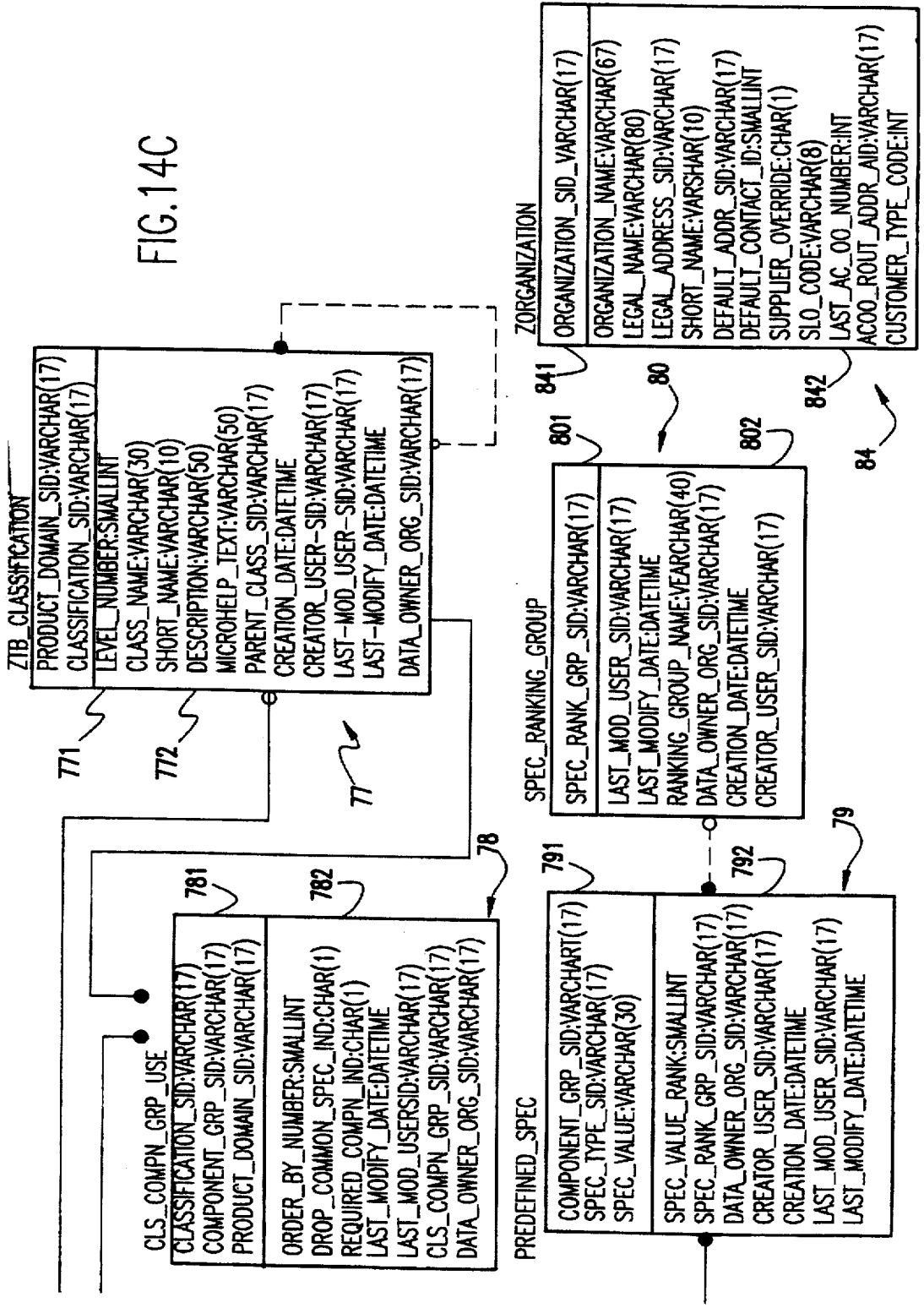
Figure 14D:
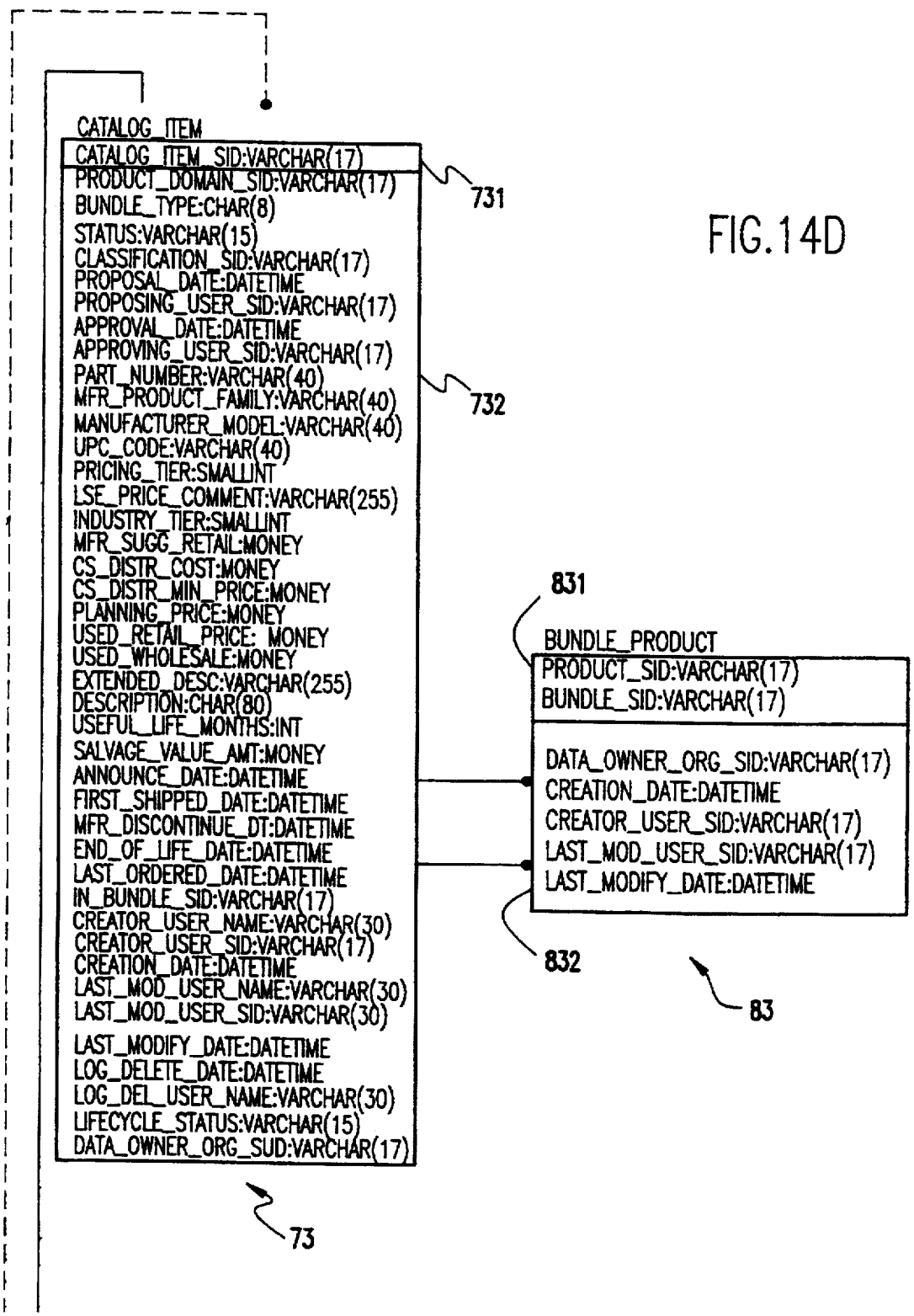

FIG. 13 is a data model of the data structure according to the invention. The data model is for a product catalog 100, and the central part of this is a product table 101 which is linked to a catalog item table 102. A product in table 101 is identified by manufacturer by a link to manufacturer table 103. A product in table 101 may be described by a resource 104. The product domain 110 is linked to the product table 101 and categorizes the product. The product class 120 is also linked to the product table and classifies the product.

A product is composed of various components; therefore, a product in table 101 is linked to a product component table 130, which is a subclass of a specific set of components for that product. A component in table 131 is also identified by manufacturer by a link to manufacturer table 103. A component in component table 131 may constitute a component in the product component table 130, or the component in component table 130 may be used by a component group in table 132. The subclass component group usage table 133 validates that a component group in component group table 132 is valid for the product component in table 130. A component in component table 131 may apply to a particular component type in table 134 which is included in a component group in table 132. A component in table 131 may be constituted by a resource component 135. Moreover, a component in component table 131 may be directly linked to a product in product table 101.

Components in component table 131 are linked to a component specification table 140. The component specifications in table 140 are linked to a unit of measure table 141 which quantifies the unit component specification. A unit of measure in table 141 is, in turn, quantified by a measurement group in table 142. The component specification 140 can also be used by a component group specification type usage table 143. This table, in turn, is linked to component group table 132. A component group specification type usage in table 143 is linked to a specification type in table 144 and may be aided by a component group predefined specification in table 145. A predefined specification uses a specification value ranking group in table 146 to which it is linked.

A product in table 101 may be part of a bundle product, and the data structure provides a link to a bundle product table 150. A bundle product in table 150 is linked to a bundle package in bundle table 151, and the bundle package is further identified by a link to a supplier table 152.

Besides the technical specifications of products and their constitute components, the data structure also supports various economic attributes of products. For example, a product in table 101 can have product lease and pricing guidelines 161 and typically will be covered by a product warranty 162. The subclass lease pricing table 163 is linked to product table 101 and supplements the lease pricing guideline 161. Optionally, there may be a sales promotion for a product, such as when first being introduced to the market or finally being phased out of the market. Any such promotion is stored in table 164 and linked to the applicable product in product table 101. The details of the promotion are stored in table 165 and linked to the promotion stored in table 164.

The data model shown in FIG. 13 illustrates a comprehensive data structure having general application implementing electronic catalogs on a computer system. Specific applications may not require all the tables shown. For example, besides the product promotion table 164 described as optional, the manufacturer table 103 may be eliminated by directly incorporating the data in that table in the product table 101 and the component table 131. Similarly, the data of other tables may be combined, and additional tables may be added to this data structure.

FIGS. 14A to 14D, arranged according to FIG. 14, are an entity relationship diagram of the data structure built by the process shown in the flow diagram of FIG. 2 according to the invention. This is a more detailed version of a data structure based on the data model shown in FIG. 13. Each of the entities in this diagram is a separate file or table, and the several tables are linked to one another in a way that provides complete product information at the component or specification level. This diagram is for a specific implementation, and it will be understood by those skilled in the art that the specific field types and number of characters are merely illustrative.

The first entity is the product_component entity 70 which is composed of primary keys 701 and a junction table 702 that links products to components. The primary keys in combination uniquely identifies a specific component of a specific product. A product component has associated specification values. The product_component entity 70 identifies a particular product as being made up of certain components. For example, the IBM PS series of personal computers would be defined here as being made of certain components. The first field in the primary keys 701 of the product_component entity 70 is "component_grp_sid:varchar(17)". "component_grp_sid" is the field name, in this case the component, group and system identification (ID) field, while "varchar(17)" is the data type, in this case seventeen alpha numeric characters. This key is an identifier assigned by the system which is absolutely unique across all databases and servers. The "sid" indicates that this identification field is assigned by the system. This identifier is used for internal references only and is not visible to the user through pre-written applications. The additional primary key fields include the following:

"component_sid:varchar(17)"—uniquely identifies a common component.

"product_domain_sid:varchar(17)"—uniquely identifies a product domain.

"product_sid:varchar(17)"—a unique identifier for a product.

The junction table 702 includes the following fields:

"data_owner_org_sid:varchar(17)"—the system ID of the organization which has data ownership rights to the specific row (record) in the associated table.

"order_by_number:smallint"—establishes both the order that components will be displayed for a product and the order that description segments will be concatenated in extended description.

"quatity:smallint"—handles multiple instances of exactly the same components for a product.

"classification_sid:varchar(17)"—a unique identifier for a product subclass.

"creation_date:datetime"—the date and time of creation of this record.

"creator_user_sid:varchar(17)"—the ID of the user who first added the associated record to the system.

"last_mod_user_sid:varchar(17)"—uniquely identifies the user who last updated the associated record.

"last_modify_date:datetime"—the date and time the associated record was last updated by the system.

The junction table 702 provides the links to the component entity 71, the component_group entity 72, the catalog_item entity 73, and the product_domain 74.

The component entity 71 identifies specific components and is, again, composed of primary keys 711 and a junction table 712. The component entity 71 identifies a specific component such as, for example, a Tandem disk drive. Since this component can be used in a variety of products, it needs to be defined only once. When product components and product specifications are added, the user may choose from a list of common components to copy to the product, if a common component applies. This entity promotes efficiency, data integrity and quality assurance.

The primary key fields 711 include the following:

"component_grp_sid:varchar(17)"—an identifier which is absolutely unique across all databases and servers for a component_group. This identifier is used for internal references only and is not visible to the user through pre-written applications.

"component_sid:varchar(17)"—uniquely identifies a common component.

The junction table 712 includes various fields that provide distinguishing designations for the component, including:

"as_product_sid:varchar(17)"—for a component which is also cataloged as a product, this is the product_system_if for the component as a product of the product table.

"product_desc_seg:varchar(20)"—significant specification level information about a component in context of a product it is used in. It is the portion of the product description which is taken from its product component.

"data_owner_org_sid:varchar(17)"—the system ID of the organization which has data ownership rights to the specific row (record) in the associated table.

"product_domain_sid:varchar(17)"—uniquely identifies a product domain.

"creation_data:datatime"—the date and time the associated row (record) created.

"creator_user_sid:varchar(17)"—the ID of the user who first added the associated record to the system.

"last_mod_user_sid:varchar(17)"—uniquely identifies the user who last updated the associated record.

"last_modify_date:datetime"—the date and time the associated record was last updated by the system.

"component_typ_name:varchar(40)"—the name and type of the component.

The component_group entity 72 provides a general classification of components, such as, for example, disk drives. Components are put together to define the technical make-up and establish product "identifiers" of a product. This defines a group for similar kinds of components. In this table, components are put together to define the technical makeup and establish product "identifiers" of a product. Component groups serve as a template when defining the components that makeup a product; e.g., storage device, processor, port, etc.

The component_group entity 72 has a single primary key 721, "component_grp_sid:varchar(17)", an identifier assigned by the system which is absolutely unique across all databases and servers for a component_group, and a junction table 722. The junction table 722 includes the following fields:

"component_grp_name:varchar(30)"—a textual description for a component type; e.g., storage device.

"microhelp_text:varchar(50)"—a user help text.

"sem_qty_conv_ind:char(1)"—indicates whether products (of this group) that have components with quantity greater than one are to be associated to actual resources as separate instances or not. If the character is "Y", the resulting resource is associated to separate instances of a component, but if the character is "N", then the resulting resource is associated to one component using quantity.

"product_domain_sid:varchar(17)"—uniquely defines a product domain.

"data_owner_org_sid:varchar(17)"—the system ID of the organization which has data ownership fights to the specific row (record) in the associated table.

"creator_user_sid:varchar(17)"—the ID of the user who first added the associated record to the system.

"creation_date:datetime"—the date and time the associated record was first added to the system.

"last_mod_user_sid:varchar(17)"—uniquely identifies the user who last updated the associated record.

"last_modify_date:datetime"—the date the associated record was last updated by the system.

The junction table 722 provides links to the component entity 71, component_spec entity 75, having primary keys 751 and a junction table 752, and also to the component_grp_spec_use entity 76, again having primary keys 761 and a junction table 762. The junction table 712 of component entity 71 also provides a link to the component_spec entity 75.

The component specification entity is a pre-defined, standard component type with filled-in specification values. When product components and product component specifications are added, the user may choose from a list of common components to copy to the product, if a common component applies. Again, this promotes efficiency, data integrity and quality assurance.

The component_spec entity 75 includes the following primary key fields 751:

"component_grp_sid:varchart(17)"—an identifier assigned by the system which is absolutely unique across all databases and servers for a component_group. This identifier is used for internal references only and is not visible to the user through pre-written applications.

"component_sid:varchar(17)"—uniquely identifies a common component.

"spec_type_sid:varchar(17)"—uniquely identifies a product specification and is associated with a specification name.

The junction table 752 includes the following fields:

"data_owner_org_sid:varchar(17)"—the system ID of the organization which has data ownership rights to the specific row (record) in the associated table.

"measure_group_name:varchar(20)"—identifies a group of related units of measure; e.g., bytes, weight, etc.

"std mesure value:float"—the standard measurement value for a product specification that relates to a unit of measure. For example, for the specification "capacity", the specification value could be 300 with a unit of measure of MB, resulting in a standard measurement value of 300×1024=307200 where KB is the standard of measure and 1024 is the conversion factor from MB to KB.

"entered_value:varchar(40)"—the actual value for a product specification. For example, for a processor class, a specification value could be "i486DX/2 66 MHz". If the specification being entered is rankable, then it must be selected from a predefined specification value, and if that specification value is related to a unit of measure, then it is typically numeric (e.g., 300 MB).

"unit_of_meas_name:varchar(10)"—the unit of measure such as KB, MB, mm, in, etc.

"last_mod_user_sid:varchar(17)"—uniquely identifies the use who last updated the associated record.

"last_modify_date:datetime"—the date the associated record was last updated by the system.

"specification_name:varchar(20)"—the standard entry/display label used for a type of specification; e.g., RAM, PPM, MHz, etc.

The component_grp_spec_use entity 76 provides an association of subclass component types to subclass component type specification types. With this association, the user may choose to limit the specification search to only those that have been previously associated with the component type. The user may also choose to see the entire list of specification types, if the specification type had not been previously associated with the component type.

The component_grp_spec_use entity 76 has the following primary key fields 761:

"component_grp_sid:varchar(17)"—an identifier assigned by the system which is absolutely unique across all databases and servers for a component_group. This identifier is used for internal references only and is not visible to the user through pre-written applications.

"spec_type_sid:varchar(17)"—denotes whether specification values of this specification type can be ranked according to ranking groups. In the preferred embodiment, the specification value must come from a list of predefined values.

"specification_name:varchar(20)"—the standard entry/display label used for a type of specification; e.g., RAM, PPM, MHz, etc.

The component_grp_spec_use entity 76 has the following fields in the junction table 762:

"predef_spec_usage:char(1)"—

"data_owner_org_sid:varchar(17)"—the system ID of the organization which has data ownership fights to the specific row (record) in the associated table.

"last_modify_date:datetime"—the date the associated record was last updated by the system.

"last_mod_user_sid:varchar(17)"—uniquely identifies the user who last updated the associated record.

"measure_group_name:varchar(20)"—identifies a group of related units of measure; e.g., bytes, weight, etc.

"rankable_spec_ind:char(1)"—denotes whether specification values of this specification type can be ranked according to ranking groups.

The junction tables 752 and 762 both provide links to specification_type entity 85, having primary keys 851 and junction table 852. The specification type entity is a template of a detailed characteristic that will ultimately be associated with a product component. This entity establishes a specification name and rules describing how the specification value will be formatted and used.

The primary key fields 851 include the following:

"spec_type_sid:varchar(17)"—uniquely identifies a product specification.

"specification_name:varchar(20)"—the standard entry/display label used for a type of specification; e.g., RAM, PPM, MHz, etc.

The junction table 852 includes the following fields:

"last_mod_user_sid:varchar(17)"—uniquely identifies the user who last updated the associated record.

"last_modify_date:datetime"—the date and time the associated record was last updated by the system.

"microhelp_text:varchar(80)"—user help text.

"data_owner_org_sid:varchar(17)"—the system ID of the organization which has data ownership rights to the specific row (record) in the associated table.

"creator_user_sid:varchar(17)"—the ID of the user who first added the associated record to the system.

"creation_date:datetime"—the date and time the associated record was first added to the system.

The junction table 762 of the compn_grp_spec_use entity 76 also provides a link to the measurement_group entity 86 which, in turn, is linked to the unit_of_measure entity 87. The entity 86 provides an association of units of measure and has a single primary key field 861, "measure_group_name:varchar(20)", which identifies a group of related units of measure, and a junction table 862 having the following fields:

last_mod_user_sid:varchar(17)—uniquely identifies the user who last updated the associated record.

last_modify_date:datetime—the date and time the associated record was last updated by the system.

microhelp_text:varchar(50)—user help text.

The unit_of_measure entity 87 provides a precisely specified quantity in terms of which the magnitudes of other quantities of the same kind can be stated and compared. The unit of measure establishes a standard value for the specification value being measured. In this way, disk drive capacities, for example, can be stated as 1.44 MB, 3.2 GB and 720 KB and still be accurately compared using this entity.

The key fields 871 are as follows:

measure_group_name:varchar(17)—identifies a group of related units of measure; e.g., bytes, weight, etc.

unit_of_meas_name:varchar(10)—identifies the unit of measure, such as MB or mm, for example.

The junction table 872 includes the following fields:

conversion_factor:float—a factor used to convert a unit or measure value to a standard unit of measure value for comparison.

last_modify_date:datetime—the date and time the associated record was last updated by the system.

last_mod_user_sid:varchar(17)—uniquely identifies the user who last updated the associated record.

data_owner_org_sid:varchar(17)—the system ID of the organization which has data ownership rights to the specific row (record) in the associated table.

The catalog_item entity 73 provides information on product availability for sale by manufacturer. This information is derived from a manufacturer's or publisher's description of a product identified by a part number. Similarly, a service offered by an organization may be identified by a service offering number and description.

There is a single primary key 731, "catalog_item_sid:varchar(17)", which is a system assigned catalog item ID, and a junction table 732 providing links to other entities. The junction table includes the following fields:

"product_domain_sid:varchar(17)"—uniquely identifies a product domain.

"bundle_type:char(8)"—identifies a bundle type which includes the product.

"status:varchar(15)"—indicates whether a product is approved or proposed (pending approval).

"classification_sid:varchar(17)"—a unique identifier for a product subclass.

"proposal_date:datetime"—the date a product was first proposed.

"proposing_user_sid:varchar(17)"—the system ID of the user who proposed the product.

"approval_date:datetime"—the date a product was approved.

"approving_user:varchar(17)"—the system ID of the user who approved the product.

"part_number:varchar(40)"—the manufacturer's or publisher's part number assigned to the product. This number uniquely identifies a specific product made by the manufacturer or publisher.

"mfr_product_family:varchar(40)"—a manufacturer-created product identifier which typically refers to a product line containing multiple specific products (e.g., "PS/ValuePoint", "Prolinea 4/25", etc.).

"maufacturer_model:varchar(40)"—for a product in the hardware domain, it is the manufacturer's designated model name.

"upc_code:varcahar(40)"—the uniform product code (UPC) for the item.

"pricing_tier_no:smallint"—a means of categorizing a product for lease pricing. The tier is associated with a present value percentage which is used to calculate rental fees. The lower the tier, the higher the product's value.

"lse_price_comment:varchar(255)"—a comment field on leasing or pricing conditions for the product.

"Industry_tier:smallint"—a subjective grouping of products that is generally accepted throughout a particular industry; e.g., for the computer industry, the Gartner Group is a company that publishes this information.

"mfr_sugg_retail:money"—the manufacturer's suggested retail price (MSRP).

"cs_distr_cost:money"—the actual cost paid to a vendor or supplier for this product.

"cs_distr_min_price:money"—the minimum retail price that should be obtained for the product.

"planning_price:money"—this is the price that will be used in forecast and budgeting for information and planning purposes.

"used_retail_price:money"—a calculated price based on a used value of the product. This price can be overridden by a market specialist.

"used_wholesale:money"—this price is a ratio of the retail used price.

"extended_desc:varchar(255)"—a system generated product description made up of concatenated fields associated with the product.

"description:char(80)"—the standard product description to be used when a short version of the description is more appropriate than an extended description. For example, invoices would use the short version in order to conserve printed or electronic space.

"useful_life_months:Int"—the normal useful life of a product in months.

"salvage_value_amt:money"—the monetary salvage value of a product.

"announce_date:datetime"—the date a product is first announced as a new product.

"first_shipped_date:datetime"—the date a product is first shipped by a manufacturer.

"mfr_discontinue_dt:datetime"—the date a product is discontinued by a manufacturer.

"end_of_life_date:datetime"—the estimated date a product will no longer have residual value.

"last_ordered_date:datetime"—the date of the last order for the product.

"in_bundle_sid:varchar(17)"—this is derived (not stored) element and indicates whether or not the product is in a product "bundle". This is derived from the fact that the product ID is listed one or more times in the bundled product entity.

"creator_user_name:varchar(30)"—the name of the user who first added the associated record to the system.

"creator_user_sid:varchar(17)"—the ID of the user who first added the associated record to the system.

"creation_date:datetime"—the date the associated record was first added to the system.

"last_mod_user_name:varchar(30)"—name of the user who last updated the associated record.

"last_mod_user_sid:varchar(17)"—uniquely identifies the user who last updated the associated record.

"last_modify_date:datetime"—the date and time the associated record was last updated by the system.

"log_delete_date:datetime"—the date and time at which a row in an entity table was logically deleted by a user via an application.

"log_del_user_name:varchar(30)"—the database user name for the user who performed a logical delete on the associated record.

"lifecycle_status:varchar(15)"—indicates the manufacturing status of the product within its product's marketing life, including pre-release, current and discontinued.

"data_owner_org_sid:varchar(17)"—the system ID of the organization which has data ownership rights to the specific row (record) in the associated table.

The product_domain entity 74 is the highest level grouping of products and has a single primary key 741, "product_domain_sid:varchar(17)", which uniquely identifies the product domain, and a junction table 742. The product_domain entity 74 provides the broad product classification; e.g., computer hardware, automobiles, appliances, furniture, etc. Taking computer hardware as one example of the domain, the classification may be, for example, desk top computers, tower computers, laptop computers, network servers, minicomputers, or main frames.

The junction table 742 has fields that describe the product for this domain in free form or concatenated form and provide audit fields; e.g., who is responsible for maintenance, etc. The junction table 742 includes the following fields:

"domain_name:varchar(30)"—the descriptive name for a product; e.g., "hardware", "software" or "services".

"microhelp_text:varchar(50)"—user help text.

"prod_desc_rule_Ind:char(1)"—establishes whether product descriptions are generated according to an automatic description formatting rules or are entered manually.

"creation_date:datetime"—the date and time when the associated record was created.

"creator_user_sid:varchar(17)"—the ID of the user who first added the associated record to the system.

"last_modify_date:datetime"—the date the associated record was last updated by the system.

"last_modifier_sid:varchar(17)"—uniquely identifies the user who last updated the associated record.

"data_owner_org_sid:varchar(17)"—the system ID of the organization which has data ownership rights to the specific row (record) in the associated table.

The junction table 722 of the component_group entity 72 also links that entity to the predefined_spec entity 79 which, in turn, is linked to the spec_ranking_group entity 80. The spec_ranking_group entity 80 provides a rank for a component, for example, the microprocessor speed in megahertz or the access speed of a disk drive.

The predefined specification entity 79 is a standard specification value for a specification type. The standard values serve to promote and enforce data integrity and consistency provides a standard specification value for a specification type. The standard values serve to promote and enforce data integrity and consistency. Objective ranking of components is done within this entity.

The predefined specification entity 79 has the following primary key fields 791:

component_grp_sid:varchar(17)—an identifier assigned by the system which is absolutely unique across all databases and serves for a component group. This identifier is used for internal reference only and is not visible to the user through pre—written applications.

spec_type_sid:varchar(17)—uniquely identifies a product specification and is associated with a specification name; e.g., "processor class".

spec_value:varchar(30)—a standard predefined value for a specification.

The junction table 792 has the following fields:

spec_value_rank:smallint—the relative weight of a specification within its specification ranking group. One is the lowest rank.

spec_rank_grp_sid:varchar(17)—a unique identifier for a specification value ranking group.

data_owner_org_sid:varchar(17)—the system ID of the organization which has data ownership fights to the specific row (record) in the associated table.

creator_user_sid:varchar(17)—the ID of the user who first added the associated record to the system.

creation_date:datetime—the date and time the associated record was first added to the system.

last_mod_user_sid:varchar(17)—uniquely identifies the user who last updated the associated record.

last_modify_date:datetime—the date and time the associated record was last updated by the system.

The spec_ranking_group entity 80 is a grouping mechanism for applying relative weight to like specifications. It has one primary key field 801, spec_rank_grp_sid:varchar (17), which is a unique identifier for a specification value ranking group. The junction table 802 has the following fields:

last_mod_user_sid:varchar(17)—uniquely identifies the user who last updated the associated record.

last_modify_date:datetime—the date and time the associated record was last updated by the system.

ranking_group_name:varchar(40)—the name of a specification value ranking group.

data_owner_org_sid:varchar(17)—the system ID of the organization which has data ownership rights to the specific row (record) in the associated table.

creation_date:datetime—the date and time the associated record was first added to the system.

creator_user_sid:varchar(17)—the ID of the user who first added the associated record to the system.

The junction table 732 of the catalog_item entity 73 and the junction table 742 of the product_domain entity 74 also provide links to the product_warranty entity 81. The product_warranty entity 81 is, in turn, linked to the warranty_program entity 82 and associates domain and product with warranties. The product may have several warranties. For example, there may be separate warranties on the central processing unit (CPU) and the display device.

The primary key fields 811 of the product_warranty entity are as follows:

product_domain_sid:varchar(17)—a unique identifier specifying the product domain.

product_sid:varchar(17)—a system identifier of the product covered by a warranty program.

warranty_pgm_sid:varchar(17)—an identifier assigned by the system to a specific warranty program.

The junction table 812 has the following fields:

suggested_price:money—the cost of the warranty program.

last_modify_date:datetime—the date and time the associated record was last updated by the system.

last_mod_user_sid:varchar(17)—uniquely identifies the user who last updated the associated record.

data_owner_org_sid:varchar(17)—the system ID of the organization which has data ownership rights to the specific row (record) in the associated table.

Links are also established between the catalog_item entity 73 and the bundle_product entity 83. The bundle_product entity 83 groups items that a manufacture sell as a unit. The primary key fields 831 include:

"product_sid:varchar(17)"—a unique identifier for a product.

"bundle_sid:varchar(17)"—a unique identifier for a product bundle.

The junction table 832 of the bundle_product entity 83 includes the following fields:

"data_owner_org_sid:varchar(17)"—the system ID of the organization which has data ownership rights to the specific row (record) in the associated table.

"creation_date:datetime"—the date the associated record was first added to the system.

"creator_user_sid:varchar(17)"—the ID of the user who first added the associated record to the system.

"last_mod_user_sid:varchar(17)"—uniquely identifies the user who last updated the associated record.

"last_modify_date:datetime"—the date and time the associated record was last updated.

The foregoing is exemplary of a data structure created according to the invention. There may be other entities depending on specific application. For example, there may be a product promotion entity 164 linked to a product promotion detail 165, as shown in FIG. 13. Entities shown in FIGS. 14A to 14D may have more of fewer fields, again depending on specific application, and additional entities may be added.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented electronic catalog database method for collecting component and specification level data related to products in a manner that permits cataloging and managing large quantities of product data in an efficient manner, said method being implemented on a digital computer including a display device and running system software interfacing with a database manager to generate screens on said display device and comprising the steps of:

classifying data in a three tiered hierarchical data structure consisting of domains, classes and subclasses, domains being a highest level of the hierarchical data structure and each domain having its own group of classes, each class having its own group of subclasses, and each subclass having a specific set of components, all products in a subclass having these components, components in a subclass having attributes;

defining component groups for subclasses and defining a component order within each subclass in a series of tables, each table having at least one primary key field and a junction table having a plurality of fields;

linking attributes with components, the attributes having specification values and units of measure associated with them, and linking components to products using the junction tables of the series of tables;

storing the linked tables on a storage device of a digital computer having a database manager programmed and arranged to manage said data in the linked tables to allow users to input and search for specific products based on component criteria, wherein the linked tables stored on the storage device form a data structure including a product domain table, data input in said product domain table identifying product domains, each said product domain being linked to a product table, data input in said product table identifying manufactured or published products by part number and description or a service by an offering number and description, said descriptions being formatted according to concatenation rules, said product table being linked to a component table containing component information, a pricing table containing pricing and leasing information, and a warranty table containing warranty information; and generating a screen on which a user selects a domain, a class and a subclass to input and to search data in the linked tables, said database manager allowing a user to search products meeting a particular criteria including a criteria defined by logical operators, wherein data entered in the component table includes pre-defined, standard component types with filled-in specification values such that when product components and product component specifications are added, said method allowing a user to choose from a list of common components to copy thereby promoting efficiency and data integrity, said component table further being linked to a component specification table which includes information on the predefined, standard component types with filled-in specification values and to a component group specification type usage table which contains information associating subclass component types to subclass component type specification types.

2. The computer implemented method recited in claim 1 wherein said component specification table is linked to a unit of measure table, data entered in the unit of measure table quantifying entries in the component specification table allowing components in said component table to be compared, said unit of measure table including conversion factor information used to convert a unit of measure value to a standard unit of measure value for comparison.

3. The computer implemented method recited in claim 1 wherein data entered in said component group table defines a group of similar kinds of components and serves as a template when defining components that make up a product, said component group table being linked to a component group predefined specification table in which is stored standard specification values for specification types, these standard specification values promoting and enforcing data integrity and consistency, the data entered in said component group predefined specification table further including information providing a relative weight of a specification within a specification ranking group.

4. The computer implemented method recited in claim 1 wherein data entered in said pricing table containing pricing and leasing information includes information on customer credit and financing terms available.

5. A computer implemented electronic catalog database method for collecting component and specification level data related to products in a manner that permits cataloging and managing large quantities of product data in an efficient manner, said method being implemented on a digital computer including a display device and running system software interfacing with a database manager to generate screens on said display device and comprising the steps of:

classifying data in a three tiered hierarchical data structure consisting of domains, classes and subclasses; domains being a highest level of the hierarchical data structure and each domain having its own group of classes, each class having its own group of subclasses, and each subclass having a specific set of components, all products in a subclass having these components, components in a subclass having attributes;

defining component groups for subclasses and defining a component order within each subclass in a series of tables, each table having at least one primary key field and a junction table having a plurality of fields;

linking attributes with components, the attributes having specification values and units of measure associated with them, and linking components to products using the junction tables of the series of tables;

storing the linked tables on a storage device of a digital computer having a database manager programmed and arranged to manage said data in the linked tables to allow users to input and search for specific products based on component criteria, wherein the linked tables stored on the storage device form a data structure including a product domain table, data input in said product domain table identifying product domains, each said product domain being linked to a product table, data input in said product table identifying manufactured or published products by part number and description or a service by an offering number and description, said descriptions being formatted according to concatenation rules, said product table being linked to a component table containing component information, a pricing table containing pricing and leasing information, and a warranty table containing warranty information; and generating a screen on which a user selects a domain, a class and a subclass to input and to search data in the linked tables, said database manager allowing a user to search products meeting a particular criteria including a criteria defined by logical operators, wherein data entered in the component table includes pre-defined, standard component types with filled-in specification values such that when product components and product component specifications are added, said method allowing a user to choose from a list of common components to copy thereby promoting efficiency and data integrity, said component table further being linked to a component specification table which includes information on the pre-defined, standard component types with filled-in specification values and to a component group specification type usage table which contains information associating subclass component types to subclass component type specification types, wherein said linked tables further included a bundle product table linked to said product table, data entered in said bundle product table storing information of component packages included in a product in said product table.

6. A computer implemented electronic catalog database method for collecting component and specification level data related to products in a manner that permits cataloging and managing large quantities of product data in an efficient manner, said method being implemented on a digital computer including a display device and running system software interfacing with a database manager to generate screens on said display device and comprising the steps of:

classifying data in a three tiered hierarchical data structure consisting of domains, classes and subclasses, domains being a highest level of the hierarchical data structure and each domain having its own group of classes, each classes having its own group of subclasses, and each subclass having a specific set of components, all products in a subclass having these components, components in a subclass having attributes;

defining component groups for subclasses and defining a component order within each subclass in a series of tables, each table having at least one primary key field and a junction table having a plurality of fields;

linking attributes with components, the attributes having specification values and units of measure associated with them, and linking components to products using the junction tables of the series of tables;

storing the linked tables on a storage device of a digital computer having a database manager programmed and arranged to manage said data in the linked tables to allow users to input and search for specific products based on component criteria, wherein the linked tables stored on the storage device form a data structure including a product domain table, data input in said product domain table identifying product domains, each said product domain being linked to a product table, data input in said product table identifying manufactured or published products by part number and description or a service by an offering number and description, said descriptions being formatted according to concatenation rules, said product table being linked to a component table containing component information, a pricing table containing pricing and leasing information, and a warranty table containing warranty information; and generating a screen on which a user selects a domain, a class and a subclass to input and to search data in the linked tables, said database manager allowing a user to search products meeting a particular criteria including a criteria defined by logical operators, wherein data entered in the component table includes pre-defined, standard component types with filled-in specification values such that when product components and product component specifications are added, said method allowing a user to choose from a list of common components to copy thereby promoting efficiency and data integrity, said component table further being linked to a component specification table which includes information on the pre-defined, standard component types with filled-in specification values and to a component group specification type usage table which contains information associating subclass component type to subclass component, type specification types, wherein data entered in said warranty table linked to said product table includes information on a warranty program, if any, of a product in said product table, said information on the warranty program including a price of the warranty program, time period when the warranty program is in effect, and conditions under the warranty program.

7. An electronic catalog in which component and specification level data related to products are collected, said electronic catalog including a digital computer having a storage device, a display device, and system software for managing, controlling and displaying catalog data comprising:

a data structure comprising a hierarchical data structure programmed and arranged for classifying data in a three tiered hierarchical structure consisting of domains, a highest level, classes, a next level which groups similar products, each domain have its own group of classes, and subclasses having a specific set of components, all products in a subclass having these components, components in a subclass having attributes and attributes having specification values associated with them, said data structure being stored on said storage device as a series of linked tables, each said table having at least one primary key field and a junction table having a plurality of fields, said junction table providing links to other tables in the data structure, wherein said linked tables include a product domain table identifying product domains, each said product domain being linked to a product table which identifies manufactured or published products by part number and description or a service by an offering number and description, said descriptions being formatted according to concatenation rules, said product table being linked to a component table containing component information, a pricing table containing pricing and leasing information, and a warranty table containing warranty information, wherein said component table includes pre-defined, standard component types with filled-in specification values such that when product components and product component specifications are added, a user may choose from a list of common components to copy thereby promoting efficiency and data integrity, said component table further being linked to a component specification table which includes information on the pre-defined, standard component types with filled-in specification values and to a component group specification type usage table which contains information associating subclass component types to subclass component type specification types; and a database manager programmed and arranged for managing said data structure to allow users to input and search for specific products based on component criteria, said database manager interfacing with said system software to generate a screen on said display device on which a user selects a domain, a class and a subclass to input and to search data in said linked tables, said database manager allowing a user to search products meeting a particular criteria including a criteria defined by logical operators.

8. The electronic catalog recited in claim 7 wherein said component specification table is linked to a unit of measure table, entries in the unit of measure table quantifying entries in the component specification table allowing components in said component table to be compared, said unit of measure table including conversion factor information used to convert a unit of measure value to a standard unit of measure value for comparison.

9. The electronic catalog as recited in claim 7 wherein said component group table defines a group of similar kinds of components and serves as a template when defining components that make up a product, said component group table being linked to a component group predefined specification table which stores standard specification values for specification types, thereby promoting and enforcing data integrity and consistency, said component group predefined specification table further including information providing a relative weight of a specification within a specification ranking group.

10. An electronic catalog in which component and specification level data related to products are collected, said electronic catalog including a digital computer having a storage device, a display device, and system software for managing, controlling and displaying catalog data comprising:

a data structure comprising a hierarchical data structure programmed and arranged for classifying data in a three tiered hierarchical structure consisting of domains, a highest level, classes, a next level which groups similar products, each domain have its own group of classes, and subclasses having a specific set of components, all products in a subclass having these components, components in a subclass having attributes and attributes having specification values associated with them, said data structure being stored on said storage device as a series of linked tables, each said table having at least one primary key field and a junction table having a plurality of fields, said junction table providing links to other tables in the data structure, wherein said linked tables include a product domain table identifying product domains, each said product domain being linked to a product table which identifies manufactured or published products by part number and description or a service by an offering number and description, said descriptions being formatted according to concatenation rules, said product table being linked to a component table containing component information, a pricing table containing pricing and leasing information, and a warranty table containing warranty information, wherein said component table includes pre-defined, standard component types with filled-in specification values such that when product components and product component specifications are added, a user may choose from a list of common components to copy thereby promoting efficiency and data integrity, said component table further being linked to a component specification table which includes information on the pre-defined, standard component types with filled-in specification values and to a component group specification type usage table which contains information associating subclass component types to subclass component type specification types, and wherein said linked tables further include a bundle product table linked to said product table, said bundle product table storing information of component packages included in a product in said product table; and a database manager programmed and arranged for managing said data structure to allow users to input and search for specific products based on component criteria, said database manager interfacing with said system software to generate a screen on said display device on which a user selects a domain, a class and a subclass to input and to search data in said linked tables, said database manager allowing a user to search products meeting a particular criteria including a criteria defined by logical operators.

11. An electronic catalog in which component and specification level data related to products are collected, said electronic catalog including a digital computer having a storage device, a display device, and system software for managing, controlling and displaying catalog data comprising:

a data structure comprising a hierarchical data structure programmed and arranged for classifying data in a three tiered hierarchical structure consisting of domains, a highest level, classes, a next level which groups similar products, each domain have its own group of classes, and subclasses having a specific set of components, all products in a subclass having these components, components in a subclass having attributes and attributes having specification values associated with them, said data structure being stored on said storage device as a series of linked tables, each said table having at least one primary key field and a junction table having a plurality of fields, said junction table providing links to other tables in the data structure, wherein said linked tables include a product domain table identifying product domains, each said product domain being linked to a product table which identifies manufactured or published products by part number and description or a service by an offering number and description, said descriptions being formatted according to concatenation rules, said product table being linked to a component table containing component information, a pricing table containing pricing and leasing information, and a warranty table containing warranty information, wherein said component table includes pre-defined, standard component types with filled-in specification values such that when product components and product component specifications are added, a user may choose from a list of common components to copy thereby promoting efficiency and data integrity, said component table further being linked to a component specification table which includes information on the pre-defined, standard component types with filled-in specification values and to a component group specification type usage table which contains information associating subclass component types to subclass component type specification types, and wherein said warranty table linked to said product table includes information on a warranty program, if any, of a product in said product table, said information on the warranty program including a price of the warranty program, time period when the warranty program is in effect, and conditions under the warranty program; and a database manager programmed, a and arranged for managing said data structure to allow users to input and search for specific products based on component criteria, said database manager interfacing with said system software to generate a screen on said display device on which a user selects a domain, a class and a subclass to input and to search data in said linked tables, said database manager allowing a user to search products meeting a particular criteria including a criteria defined by logical operators.

12. The electronic catalog recited in claim 7 wherein said pricing table containing pricing and leasing information includes information on customer credit and financing terms available.

* * * * *